United States Patent [19]
Mishima et al.

[11] Patent Number: 5,983,051
[45] Date of Patent: Nov. 9, 1999

[54] IMAGE FORMATION APPARATUS EXECUTING PLURALITY REGISTERED JOBS IN ORDER

[75] Inventors: Nobuhiro Mishima, Okazaki; Yoshikazu Ikenoue, Toyohashi, both of Japan

[73] Assignee: Minolta Co., Ltd., Osaka, Japan

[21] Appl. No.: 09/127,894

[22] Filed: Aug. 3, 1998

[51] Int. Cl.⁶ .................................................. G03G 21/14
[52] U.S. Cl. ............................................. 399/83; 399/81
[58] Field of Search .................................. 399/82, 83, 85, 399/87, 81

[56] References Cited

U.S. PATENT DOCUMENTS

| | | | |
|---|---|---|---|
| 4,099,860 | 7/1978 | Connin | 355/14 |
| 5,669,040 | 9/1997 | Hisatake | 399/83 |
| 5,740,497 | 4/1998 | Yamada et al. | 399/87 |

*Primary Examiner*—Richard Moses
*Attorney, Agent, or Firm*—McDermott, Will & Emery

[57] ABSTRACT

A digital copy machine with a memory feature can have a plurality of jobs registered in a memory to execute the registered jobs in order. When the content of a job already registered in the memory is corrected, the time required for the job prior to correction and after correction is calculated. When the required time of the job is prolonged by the correction, execution of that job is deferred for a later execution. Thus, unexpected delay in processing another job can be prevented.

23 Claims, 33 Drawing Sheets

| REGION | PAGE NUMBER PN | PRECEDING-CONCATENATION | SUCCEEDING-CONCATENATION | ADDITIONAL INFORMATION |
|---|---|---|---|---|
| 00 | 1 | 00 | 01 | |
| 01 | 1 | 01 | FF | |
| 02 | 2 | 00 | 03 | |
| 03 | 2 | 03 | FF | |
| ⋮ | | | | |

F I G. 2 0

| REGISTRATION NO. | CAPA(n) | TIME(n) | REST(n) | TSUM(n) | CSUM(n) | SPACE(n) | ID(n) |
|---|---|---|---|---|---|---|---|
| 1 | 250 | 5 MINUTES | 0 | 0 | — | — | 1234 |
| 2 | 300 | 6 MINUTES | 0 | 0 | — | — | 7777 |
| 3 | 120 | 7 MINUTES | 50 SECONDS | 50 SECONDS | 820 | TOTAL AMOUNT −820 | 1234 |
| 4 | 400 | 8 MINUTES | — | 8 MINUTES 50 SECONDS | 700 | TOTAL AMOUNT −700 | 1111 |
| 5 | 300 | 6 MINUTES | — | 14 MINUTES 50 SECONDS | 300 | TOTAL AMOUNT −300 | 4444 |
| 6 | | | | | 0 | TOTAL AMOUNT −0 | |

| LIST DISPLAY | | JOB CONTENT CORRECTION | EXIT | |
|---|---|---|---|---|

ID: ****  CORRECTION CAUSING INCREASE OF JOB TIME NOT ALLOWED

| JOB-NO. | ID | END TIME | REMAINING MEMORY |
|---|---|---|---|
| 1 | | 15 MINUTES | 25% |
| 2 | | 40 MINUTES | 75% |
| 3 | **** | 65 MINUTES | 80% |
| 4 | | 80 MINUTES | 100% |
| 5 | | | |
| 6 | | | |
| 7 | | | |

| LIST DISPLAY | | JOB CONTENT CORRECTION | EXIT | |
|---|---|---|---|---|

ID: ****  EXECUTION OF JOB CORRESPONDING TO INCREASED PROCESSING TIME BECOMES LAST JOB

| JOB-NO. | ID | END TIME | REMAINING MEMORY |
|---|---|---|---|
| 1 | | 15 MINUTES | 25% |
| 2 | | 40 MINUTES | 75% |
| 3 | | 55 MINUTES | 95% |
| 4 | **** | 80 MINUTES | 100% |
| 5 | | | |
| 6 | | | |
| 7 | | | |

IMAGE FORMATION APPARATUS EXECUTING PLURALITY REGISTERED JOBS IN ORDER

This application is based on Japanese Patent Application Nos. 9-209284, 9-209285, 9-209286 and 10-206043 filed in Japan, the contents of which are hereby incorporated by reference.

BACKGROUND OF THE INVENTION

1. Field of the Invention

The present invention relates to image formation apparatuses, and more particularly, to an image formation apparatus employed as a copy machine, a facsimile apparatus, or a composite machine thereof

2. Description of the Related Art

Conventional digital copy machines with a memory function (one type of an image formation apparatus) is known. The memory function is provided to store read image data and task contents (number of copies, copy magnification rate and the like). By virtue of the memory function, input of image data and contents of a task and output of an image (copy output) can be carried out independently. One task is referred to as one job. A copy machine that has a plurality of jobs registered and executed in order is called a multi job copy machine.

In the case where a multi job copy machine is commonly used by a plurality of users, the person to register a new job can identify the time required until that newly registered job will be executed from the data amount of unprocessed job remaining in the memory.

In a multi job copy machine, the content (number of copies, magnification rate and the like) of a job registered in the memory and not yet processed may be corrected and modified. For example, when the number of copies to be taken is to be increased by correction, the time required for executing the job will be prolonged than the time prior to correction.

This means that the starting and ending time of a subsequent job will be delayed. Inconvenience will be caused to other users if the starting time and ending time of a job input by another user is delayed.

SUMMARY OF THE INVENTION

In view of the foregoing, an object of the present invention is to suppress inconvenience even when the content of a registered task is modified in a controller of an apparatus that registers and executes in order a plurality of jobs.

Another object of the present invention is to allow an operator to easily identify when his/her own job is to be executed in a controller of an apparatus that registers and executes in order a plurality of jobs.

A further object of the present invention is to suppress inconvenience even when the content of a registered task is modified in a controlling method of an apparatus that registers and executes in order a plurality of jobs.

Still another object of the present invention is to allow an operator to easily identify when his/her own job is to be executed in a controlling method of an apparatus that registers and executes in order a plurality of jobs.

The above objects of the present invention are achieved by a controller that controls jobs to be executed by an apparatus including the following elements.

According to an aspect of the present invention, a controller includes a memory for storing the order of execution of a first job and a second job, and first data corresponding to the first job. The first job is to be executed before the execution of the second job according to the order. The first data relates to a period of time for executing the first job. The controller further includes a change unit for changing the content of the first data, and a prevention unit for preventing the second job from delaying the execution due to the change of the content of the first data.

Control is provided so that, even when the first data corresponding to the fist job is changed, the succeeding second job is not delayed. As a result, inconvenience will not occur even when the content of a registered task is altered in a controller of an apparatus that executes a plurality of jobs in order.

According to another aspect of the present invention, a controller includes a memory for storing the order of execution of a plurality of jobs including a specific job, and specific data relating to the specific job. The controller further includes an input unit for entering identity data for identifying an operator, and a notification unit for notifying an order of the specific job among the plurality of jobs to the operator in a case where the identity data applied from said input means is identical to the specific data of the specific job.

When the operator enters data identifying his/herself, the order of his/her own job out of the plurality of jobs is displayed. As a result, the operator can easily identify when his/her own job is to be executed in a controller of an apparatus that executes a plurality of jobs in order.

According to a further aspect of the present invention, a method for controlling jobs to be executed by an apparatus includes the steps of storing the order of execution of a first job and a second job, and first data corresponding to the first job. The first job is to be executed before the execution of the second job according to the order. The first data relates to a period of time for executing the first job. The method further includes the steps of changing the content of the first data, and preventing the second job from delaying the execution caused by a change in the content of the first data.

Control is provided so that, even when the first data corresponding to the first job is changed, the succeeding second job is not delayed by the change. As a result, inconvenience will not occur even when the content of a registered task is modified in a controller of an apparatus that executes a plurality of jobs in order.

According to still another aspect of the present invention, a method for controlling a job to be executed by an apparatus includes the steps of storing the order of execution of a plurality of jobs including a specific job, and also specific data relating to the specific job. The method further includes the steps of entering identity data for identifying an operator, and notifying an order of the specific job among the plurality of jobs to the operator in a case where the identity data applied from said input means is identical to the specific data of the specific job.

When the operator enters data identifying his/herself, the order of his/her job is displayed out from a plurality of jobs. As a result, the operator can easily identify when his/her job is to be executed in a controller of an apparatus that executes a plurality of jobs in order.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows a specific example of a job administration table.

FIG. 36 shows a warning display when the required time of a job is prolonged by correction according to the second embodiment.

FIG. 38 shows display contents when the required time of a job is prolonged by correction according to the third embodiment of the present invention.

DESCRIPTION OF THE PREFERRED EMBODIMENTS

First Embodiment

Figure 1:
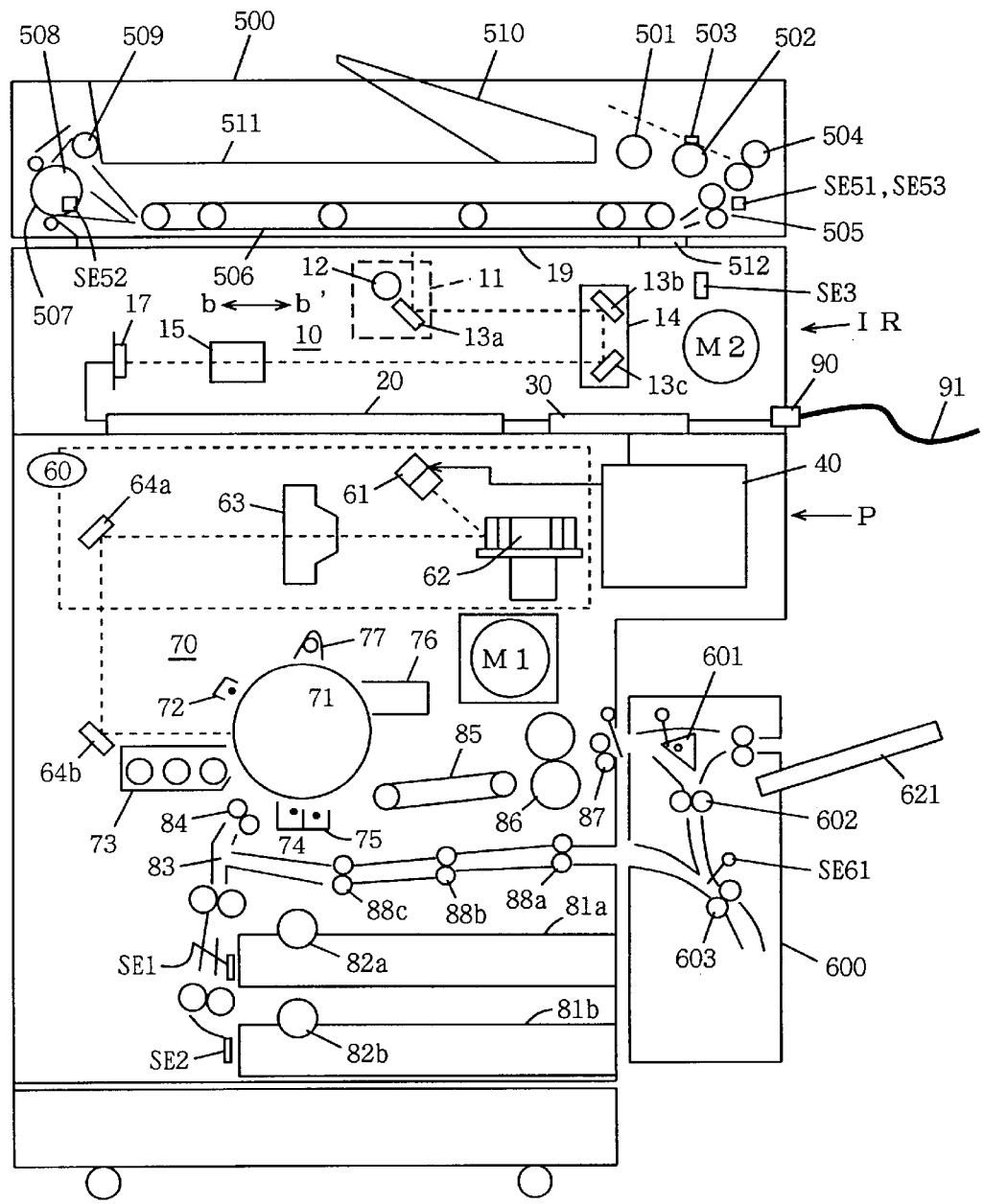
FIG. 1 is a sectional view showing an entire structure of a copy machine according to a first embodiment of the present invention.

FIG. 1 is a sectional view showing an entire structure of a digital copy machine according to a first embodiment of the present invention. Referring to FIG. 1, a digital copy machine includes a scanning system for reading an original document and converting the read information into image signals, an image signal processing unit 20 for processing image signals from scanning system 10, a memory unit 30 for storing image data from image signal processing unit 20 and providing image data to a print processing unit 40, print processing unit 40 for driving a semiconductor laser 61 according to image data output from memory unit 30, a laser optical system 60 for directing a laser beam from semiconductor laser 61 to an exposure position on a photoconductor drum 71, an image forming system 70 for developing a latent image by exposure to transfer the image on a recording sheet and fixing the same to form an image, an operation panel (not shown in FIG. 1) provided at the top plane of the main body of the copy machine, and a document feeder unit 500 for conveying a document and reversing, if necessary, the sides of a document.

An image reader IR is formed of scanning system 10 and image signal processing unit 20. A printer unit P is formed of print processing unit 40, laser optical system 60, and image forming unit 70, and the like.

Image reader IR reads an image of a document placed on document glass 19 to generate image data corresponding to each pixel of the image of the document. A first scanner 11 includes an exposure lamp 12 and a first mirror 13a. A second scanner 14 includes a second mirror 13b and a third mirror 13c. First and second scanners 11 and 14 move in the direction (subscanning direction) of arrows b and b' by the drive of a scan motor M2.

The light from exposure lamp 12 is reflected by the original document on document glass 19 to be directed to a line sensor (CCD) 17 via mirrors 13a, 13b, 13c and a lens 15. Line sensor 17 has a plurality of photoelectric conversion elements arranged in a direction (main scanning direction) perpendicular to the sheet plane of FIG. 1. Line sensor 17 reads out an image at 400 DPI, for example, to output image data corresponding to each pixel.

Line sensor 17 subscans the document image by the travel of first scanner 11 in the direction of arrows b, b'. A sensor SE3 serves to detect that first scanner 11 is at its home position.

Image data output from line sensor 17 is processed by image signal processing unit 20 to be sent to memory unit 30. Memory unit 30 compresses the image data from image signal processing unit 20 to store the compressed image data. The data is expanded to be sent to printer unit P. At this stage, a rotation editing process and the like is applied if necessary.

Memory unit 30 includes an interface unit that will be described afterwards with respect to an external device. Memory unit 30 is connected to an external device through an external cable 91 by means of an external device connector 90. The details of image signal processing unit 20 and memory unit 30 will be described afterwards.

Printer unit P will be described hereinafter. Print processing unit 40 provides control of laser optical system 60 according to the image data from memory unit 30. Laser optical system 60 includes semiconductor laser 61 emitting a laser beam that is modulation-controlled (on/off) by print processing unit 40, and a polygon mirror 62, a fθ lens 63 and mirrors 64a and 64b for directing the laser beam from semiconductor laser 61 onto photoconductor drum 71 for scanning.

A corona charger 72, a development device 73, a transfer charger 74, a separation charger 75, a cleaner 76, and an erasure lamp 77 are arranged in the direction of rotation around photoconductor drum 71 that is rotated. A toner image is formed by the well known electrophotographic process on photoconductor drum 71 to be transferred onto a sheet. A sheet is fed out from sheet feed cassettes 81a and 81b by sheet feed rollers 82a and 82b to be sent to a position of transfer charger 74 through a sheet feed path 83 and by a timing roller 84. The sheet on which a toner image is transferred at the site of transfer charger 74 is discharged to a sheet refeed unit 600 via a transportation belt 85, a fix device 86, and a discharge roller 87.

Each roller of image forming unit 70 and photoconductor drum 71 are driven by a main motor M1. Sheet size detection sensors SE1 and SE2 for detecting the size of the sheet stored in each cassette are provided in the proximity of sheet feed cassettes 81a and 81b.

Document feeder unit 500 functions to automatically feed a document set on document feed tray 510 onto document glass 19, and also discharge a document read out by scanning system 10 to document discharge unit 511.

In a normal mode, the user sets one or a plurality of documents on document feed tray 510 with the side to be read out upwards. The user also adjusts the side regulation board to the width of the document. Upon initiation of an operation, the set document is fed out from the bottom sheet one by one in order by sheet feed roller 501 to be separated from each other by an unloosen roller 502 and an unloosen pad 503. The fed document passes through an intermediate roller 504 to have the size and the like detected by a regist sensor SE51 and a width size sensor SE53. Any slanting arrangement is corrected by a regist roller 505. When the trailing end of the document passes the left end of a document scale 512, document transport belt 506 is slightly inverted in rotation and stops.

As a result, the right end of the document abuts against the edge of document scale 512. The original is set at a proper position on document glass 19. At the current stage, the leading end of the next document arrives at the position of resist roller 505 to reduce the time required for transferring the next document.

When the document is set at a proper reading position on document glass 19, the document is scanned to be read out by scanning system 10. When the reading operation of the document ends, the document is conveyed leftwards by document transport belt 506 to have its direction of transportation altered by an inversion roller 507. The sheet passes above a switching claw 508 to be discharged onto discharge tray 511.

When the readout of the first side face ends for a double-sided document, the document is conveyed leftwards by document transport belt 506 to have its direction of transportation altered by an inversion roller 507. Then, the document is sent back onto document glass 19 by switching claw 508. As a result, the second side face of the original is set at the reading position.

Following the read out of the second side face, the document is conveyed leftwards by document transport belt 506 to be discharged to discharge tray 511 via inversion roller 507, switching claw 508, and discharge roller 509.

Sheet refeed unit 600 is attached at the side face of the plinter as an additional device to effect duplex copy automatically. Sheet refeed unit 600 functions to temporarily store a sheet fed out from the main unit by discharge roller 87 and effect switch back transportation to send the sheet back again to the printer.

In a simplex copy mode, the sheet passes through sheet refeed unit 600 to be discharged to discharge tray 621. In a duplex copy mode, the left end portion of switching claw 601 moves upwards by a solenoid not shown. The sheet discharged from discharge roller 87 arrives at a forward/positive reversing roller 603 via transport roller 602.

When the trailing edge of the sheet arrives at sheet sensor SE61, forward/positive reversing roller is driven in an opposite direction. As a result, the sheet is returned to the printer. This sheet passes through horizontal transport rollers 88a, 88b and 88c to be sent to a timing roller 84 to attain a standby state.

When a plurality of sheets are fed continuously, a predetermined interval is provided between each sheet so that they will not overlap each other. The sheets are sent to sheet refeed unit 600 with such a predetermined interval. Since the length of the sheet transportation path is constant, the number of sheets of one circulation by sheet refeed unit 600 and horizontal transport rollers 88a–88c (the maximum number of circulating sheets) depends upon the sheet size.

Figure 2:
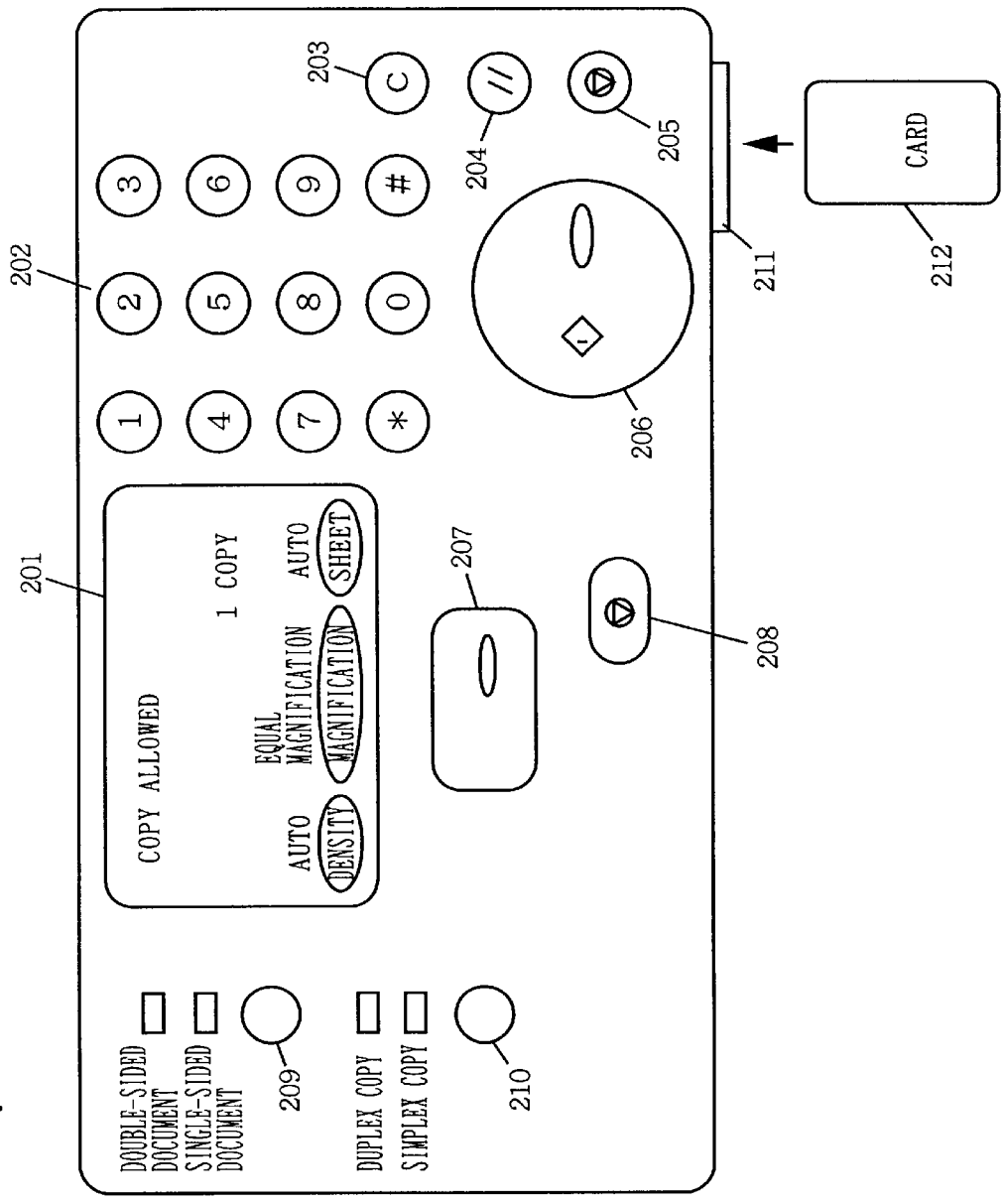
FIG. 2 is a plan view of an operation panel of the copy machine of FIG. 1.

FIG. 2 is a plan view of an operation panel of the digital copy machine of FIG. 1.

The operation panel includes a liquid crystal touch panel 201 to display the status and to set various modes, a ten-key 202 for entering numerical conditions of copy (number of copies, magnification rate, and the like), a clear key 203 to reduce the numerical conditions to the default values, a panel reset key 204 to initialize the copy mode, a stop key 205 for designating copy cessation, a start key 206 for designating initiation of a copy operation, a document specify key 209 for specifying a single-sided document or a double-sided document, a copy mode key 201 to switch between simplex copy and duplex copy, and an interruption key 208 for actuating interruption or to cancel interruption.

An ID card inlet 211 is provided at the operation panel to insert an ID card 212.

Figure 3:
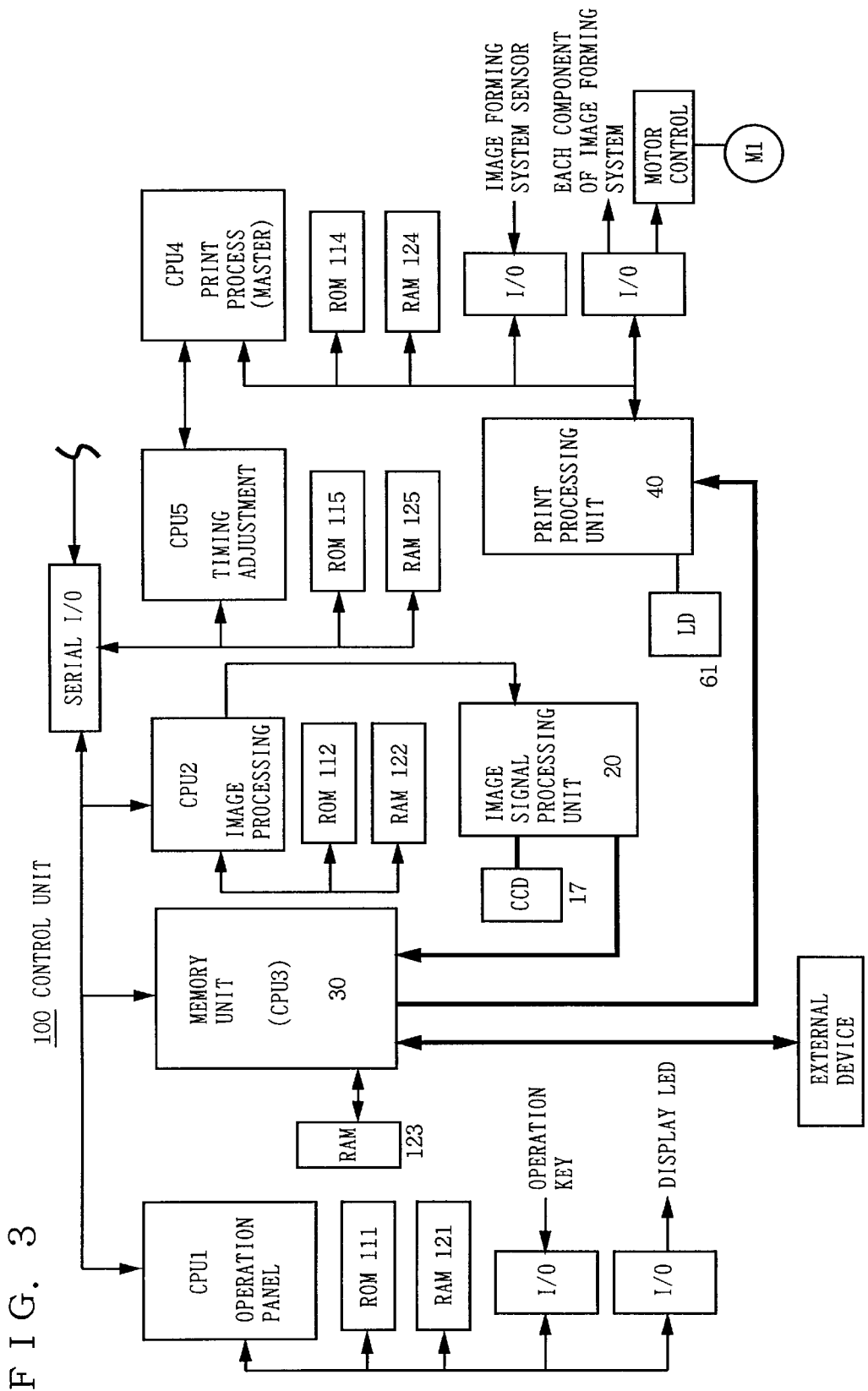
FIG. 3 is a block diagram showing a structure of a control unit of the copy machine of FIG. 1.
Figure 4:
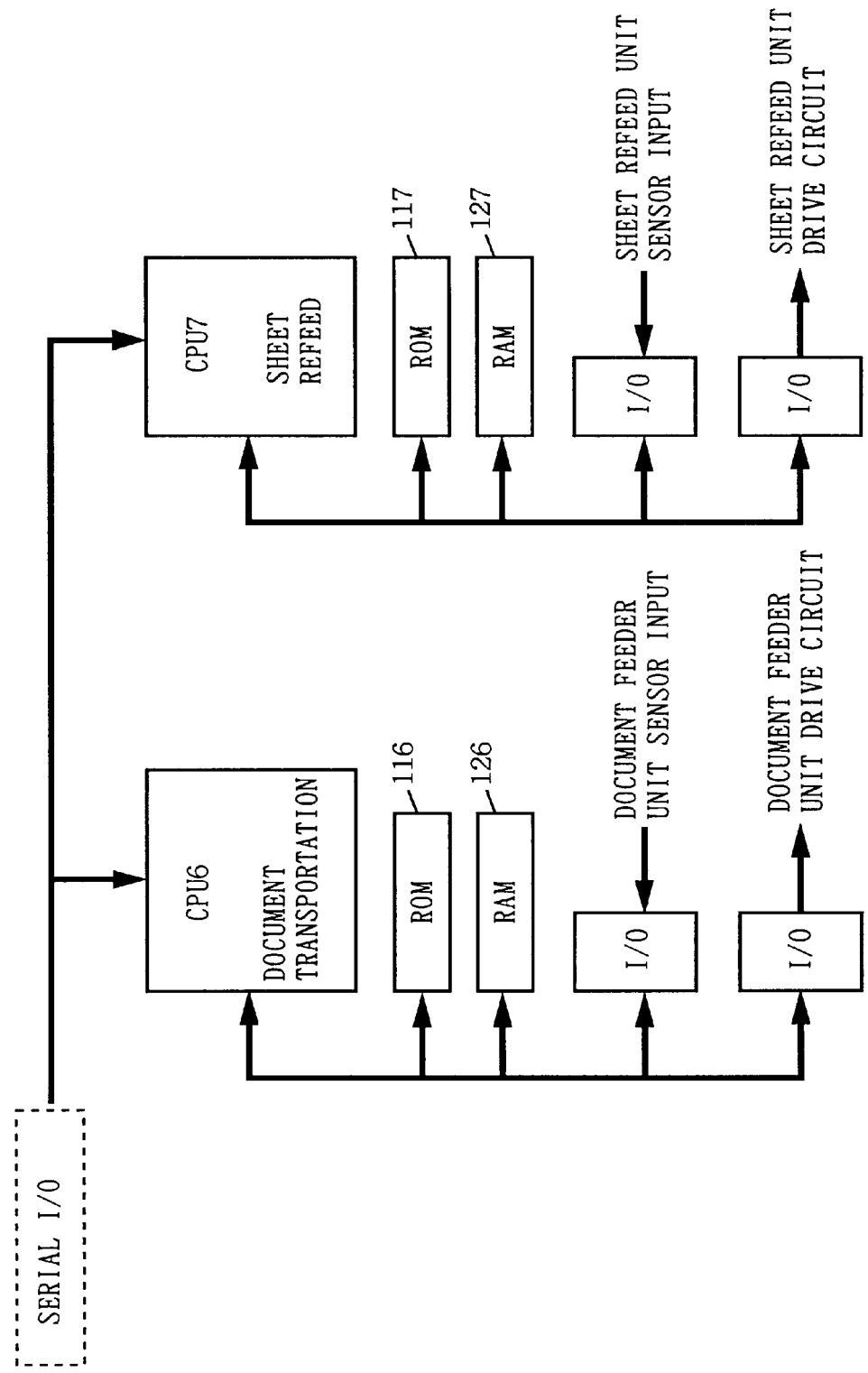
FIG. 4 is a block diagram subsequent to FIG. 3.

FIGS. 3 and 4 are block diagrams showing a structure of a control unit 100 of a copy machine.

Referring to FIGS. 3 and 4, a control unit 100 is formed based on seven CPUs 1–7. ROM 111–117 in which respective programs are stored and RAM 121–127 corresponding to the work area for program execution are provided for CPU 1–7, respectively. It is to be noted that CPU 3 is provided in memory unit 30.

CPU 1 provides control associated with signal input from various operation keys of the operation panel and the display of liquid crystal touch panel 201. CPU 2 provides control of each element of image signal processing unit 20 and the drive of scanning system 10. CPU 4 provides control of print processing unit 40, laser optical system 60 and image forming system 70. CPU 4 also provides control of main motor M1. CPU carries out the process for adjusting the entire timing of control unit 100 and for setting an operation mode.

Figure 6:
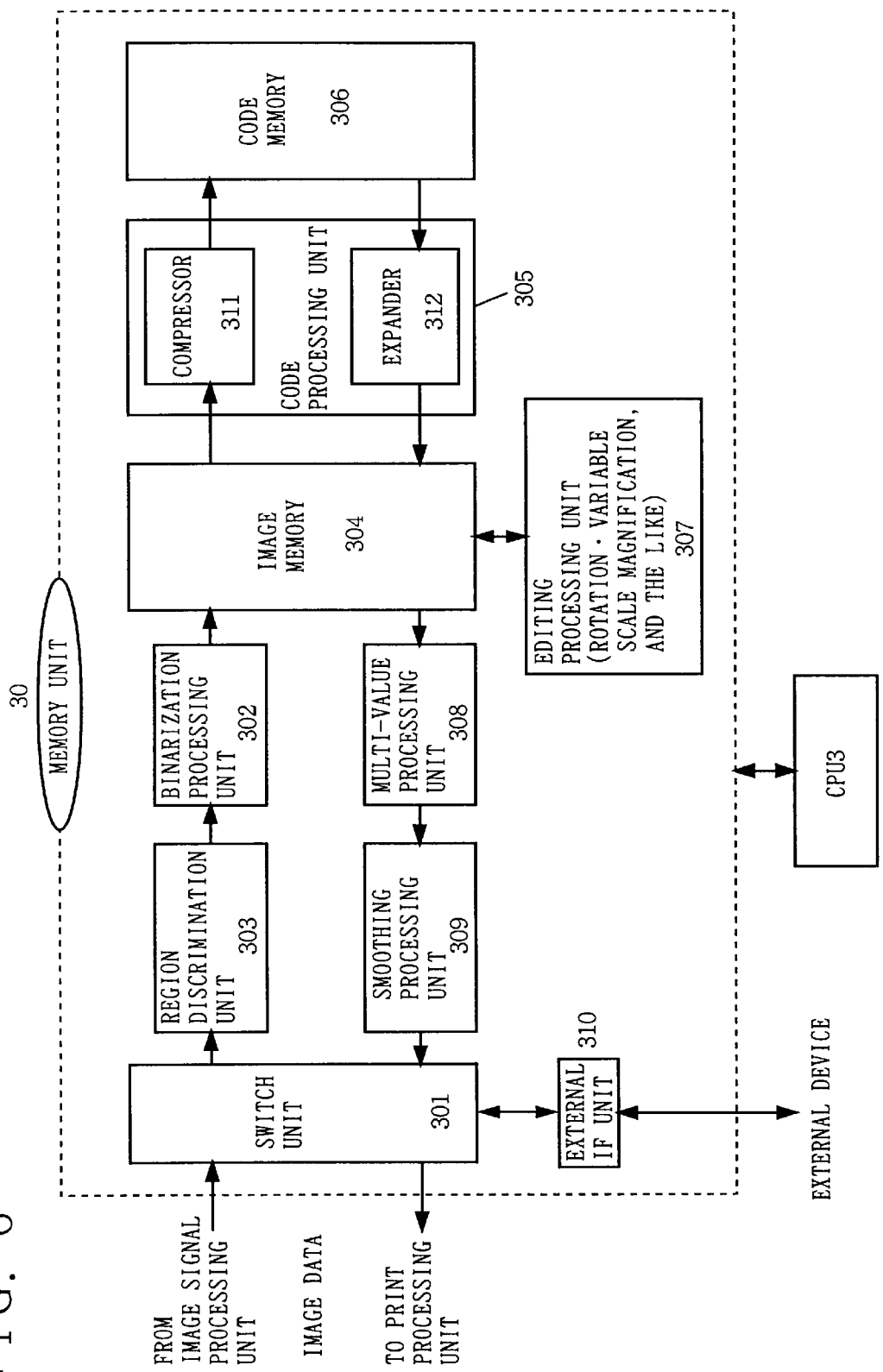
FIG. 6 is a block diagram showing a structure of a memory unit 30 of FIG. 1.

CPU 3 controls memory unit 30 so that the image data read out is temporarily stored in a memory (image memory 304 in FIG. 6). CPU 3 provides the image data in the memory to print processing unit 40. Memory unit 30 includes a function to implement interface with an external device. Input and output of image data and control data are carried out through memory unit 30.

A signal from sheet size detection sensors SE1 and SE2 is applied to the I/O under control of CPU 4. The size of a copy sheet is under control of CPU 4.

CPU 6 provides control of document transportation by document feeder unit 500. CPU 7 provides control of sheet refeed unit 600.

Figure 5:
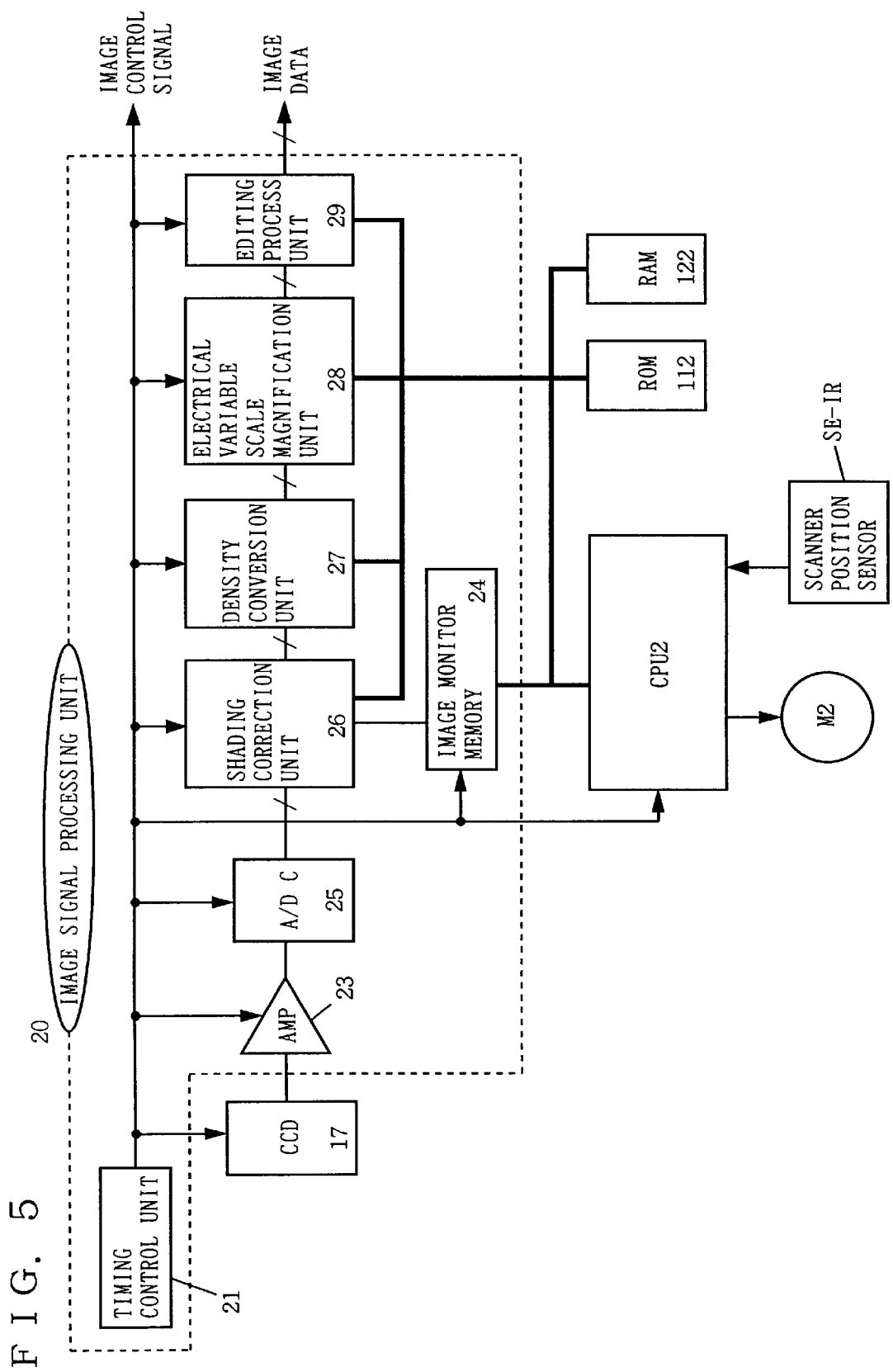
FIG. 5 is a block diagram showing a structure of an image signal processing unit 20 of FIG. 1.

FIG. 5 is a block diagram of image reader IR and image signal processing unit 20. In FIG. 5, CPU 2, ROM 112, RAM 122 and line sensor (CCD) 17 correspond to respective components of FIG. 3.

Referring to FIG. 5, an image read synchronizing signal is supplied to each block from a timing control unit 21. CCD (Line sensor) 17 converts the document information photoelectrically to generate an electrical signal. That signal is amplified by an amplifier (AMP) 23 and then converted into a 8-bit digital signal by an A/D converter 25. The digital signal is subjected to a process to removing distortion caused by optical system 60 and CCD 17 by a shading correction unit 26. Then, a process is carried out at a density conversion unit 27 to convert reflection data to density data and to apply a gamma correction.

The signal output from density conversion unit 27 is applied to an electrical variable scale magnification unit 28. A variable scale magnification process is carried out electrically in the main scanning direction from the set magnification rate information. The image data subjected to an editing process by an editing process unit 29 is supplied to printer unit P and memory unit 30.

An image monitor memory 24 stores one line of image data upon designation from CPU 2. CPU 2 provides the overall control of image reader IR such as setting the parameters towards each of image processing units 26–29, scanning control by the drive of scanner motor M2, and communication with CPU 5 (host CPU) of timing control unit 21.

The method of detecting the document size and the direction of arrangement of a document will be described hereinafter.

Determination of which portion of the readout image corresponds to the document is made according to the amount of reflected light. For example, employing the document cover as a mirror face, the document is scanned and the portion that has a great amount of reflected light is determined as corresponding to a document. The determination can be made easily since there is almost no reflected light in the case of a mirror plane. Therefore, the position of a document can be identified even when scanning is carried out with the document cover open.

CPU 2 effects preliminary scanning upon receiving an instruction of a document size detection operation from CPU 5. CPU 2 controls scanner motor M2 according to the scanner position information from a scanner position sensor SE-IR to drive first scanner 11 in the subscanning direction. At a timing corresponding to the subscanning direction, the document size and the lengthwise/crosswise arrangement of the document are detected from the contents of the image data and the scanner position information. The detected result is transmitted to host CPU 5.

The accurate location of the placed document, for example, the amount of offset or inclination angle with respect to the standard position, is similarly detected. The detected result is transmitted to CPU 5.

At the time of image readout, CPU 2 controls the speed of scanner motor M2 at a scanning speed conforming to the magnification information sent from CPU 5.

FIG. 6 is a block diagram of memory unit 30.

Referring to FIG. 6, memory unit 30 includes a bus switch unit 301 for switching the route of image data to image signal processing unit 20, print processing unit 40, and external IF unit 310, a region discrimination unit 303 for discriminating between a simple binary region and a half tone region of the input image data, a binarization processing unit 302 for generating binary data according to the parameter setting from CPU 3, an image memory 304 having a capacity corresponding to two pages, a code processing unit 305 with a compressor 311 and an expander 312 that are operable independently, a multiport code memory 306, an editing processing unit 307 to effect rotation, magnification, shiting, and the like, a multi-value processing unit 308 for carrying out a multi-value process according to the parameter setting from CPU 3, a smoothing processing unit 309 for carrying out a smoothing process, and a CPU 3 that provides the overall control thereof.

Switching unit 301 transfers image data with an external device via external IF unit 310. The image transfer between code memory 306 and external IF unit 310 can be carried out parallel to the copy process of the main body. Here, image data is compressed/expanded at code processing unit 305, if necessary.

In a copy operation of a memory mode where an image read out by scanning a document or an image applied from an external device through external IF unit 310 is temporarily stored, multi-value image data of 8 bits is applied to binarization processing unit 302 of memory unit 30 from image signal processing unit 20 via a bus switching unit 301 and region discrimination unit 303. Binarization processing unit 302 carries out a process such as error diffusion, dither, and the like to convert the multi-value image data into binary image data in a restorable range. The image data after binaiization is temporarily witten into image memory 304.

When image data is written into image memory 304, code processing unit 305 reads out and compresses the data to generate code data (compressed data). The code data is written into code memory 306. Code processing unit 305 reads out the code memory that is to be printed out from code memory 306 to expand the data. The obtained image data is written into image memory 304. Compressor 311 and expander 312 are implemented to be operated independent of each other and concurrently to improve the copy speed. Data is DMA-transferred between these components and code memory 306 by a DMA controller not shown.

When the expanded image data is transferred to image memory 304, an editing process such as rotation, scale magnification, and the like is carried out, if necessary, by editing processing unit 307.

When image data of one page is reproduced by the expansion and editing process, that data is read out from image memory 304. The readout data is restored to multi-value data, depending upon the mode, by multi-value processing unit 308 and smoothing processing unit 309. The multi-value image data is transferred to print process unit 40 or to an external device via external IF unit 310.

In such a temporary storage of a document image, code memory 306 is under control of administration table MT1 provided within RAM 123.

Figures 7, 8:
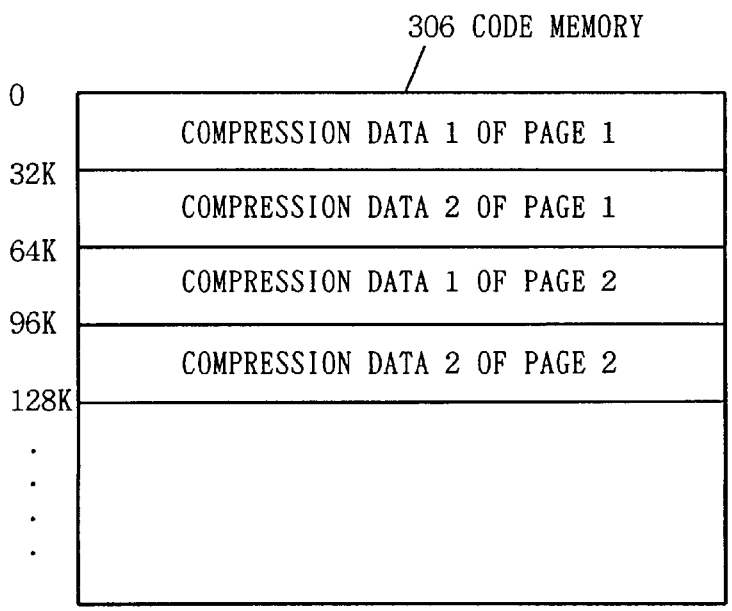
FIG. 7 shows an administration table of a code memory 306.
FIG. 8 shows a structure of code memory 306.

FIGS. 7 and 8 show the relationship between administration table MT1 and code memory 306.

Code memory 306 is divided into memory regions of 32 Kbytes in unit. Code data on a page-by-page basis is stored in respective regions on account of allowing simultaneous control of writing (reading an image) and read out (printing).

A number indicating a region in code memory 306, a page number (document image number) PN of image data assigned in the order of writing (in the order of scanning a document), the number of a concatenated region, and various additional information required in the compress/expand process such as the type of the compression method, data length, and the like are stored in administration table MT1. Code memory 306 is administered dynamically under these information.

In FIG. 7, "preceding-concatenation" indicates the connection in the preceding direction of each 32 Kbyte-region in each page. A preceding-concatenation of "00" implies that it is the first storage region of data of one page. Similarly, "succeeding-concatenation" indicates the connection in the succeeding direction. When the succeeding-concatenation is "FF", the region is the last region. A value other than "FF" indicates the number of the next connected region.

In reading out image data from image memory 304 for compression, CPU 3 controls compression unit 311 so that image data is stored into code memory 306 while referring to the information in administration table MT1. When image data is to be output, an operation opposite to the above operation is carried out to read out code data from code memory 306. The information in administration table MT1 is erased when information of the relevant page is properly read out and copy of the number of sheets (number of copies) M specified by the user is completed.

The operation sequence of the digital copy machine will be described hereinafter focusing on a request command (Q), report (A) and data flow between respective CPUs.

Figure 9:
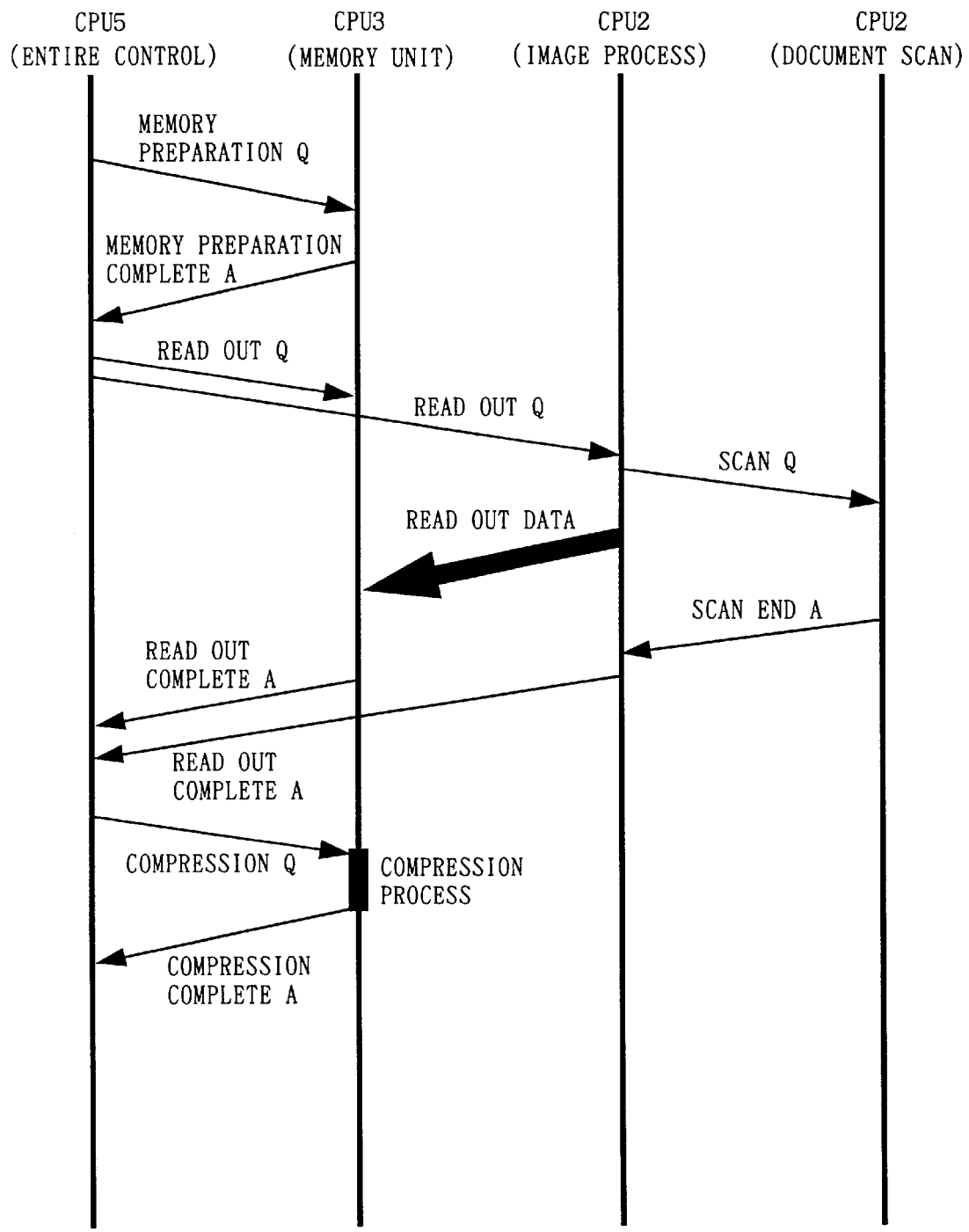
FIG. 9 shows an operation sequence in a memory write operation.

FIG. 9 shows a schematic sequence of a memory write operation. In a write operation, image data is transferred from image signal processing unit 20 to image memory 304.

Referring to FIG. 9, CPU 5 providing the entire sequence control requests CPU 3 to prepare the memory. In response, CPU 3 provides various settings with respect to the internal hardware such as specifying the bus connection status to transfer image data from image signal processing unit 20 to image memory 304, the mode for binaiization, the head address of a writing region into image memory 304, the XY length information, and the like.

When the preparation of these settings is completed, CPU 3 notifies CPU 5 that preparation of the memory is completed.

In response to CPU 5 sending a read request to CPU 3 and CPU 2, CPU 2 requests the internal document scanning unit to carry out a scanning operation.

A scanning operation is initiated by the document scanning unit. When first scanner 11 arrives at the image region, readout data (image data) is sent from image signal processing unit 20 to memory unit 30 according to the image processing mode set by CPU 2.

When the scanning operation ends and completion of readout is notified from CPU 2 and CPU 3 to CPU 5, CPU 5 sends a request to CPU 3 for data compression. In response, CPU 3 sets the readout address from image memory 304, the XY length information, the write address to code memory 306, the mode of compression unit 311 (for example, arithmetic coding method, or a MH method), and the like. Then, actuation of a relevant element is effected. Thus, a compression process is carried out to store code data into code memory 306.

When the compression process ends, CPU 3 notifies compression completion to CPU 5. If code memory 306 is full, a compression complete report including a parameter indicating that compression is disallowed is sent to CPU 5. Therefore, CPU 5 becomes aware that code memory 306 is full.

Figure 10:
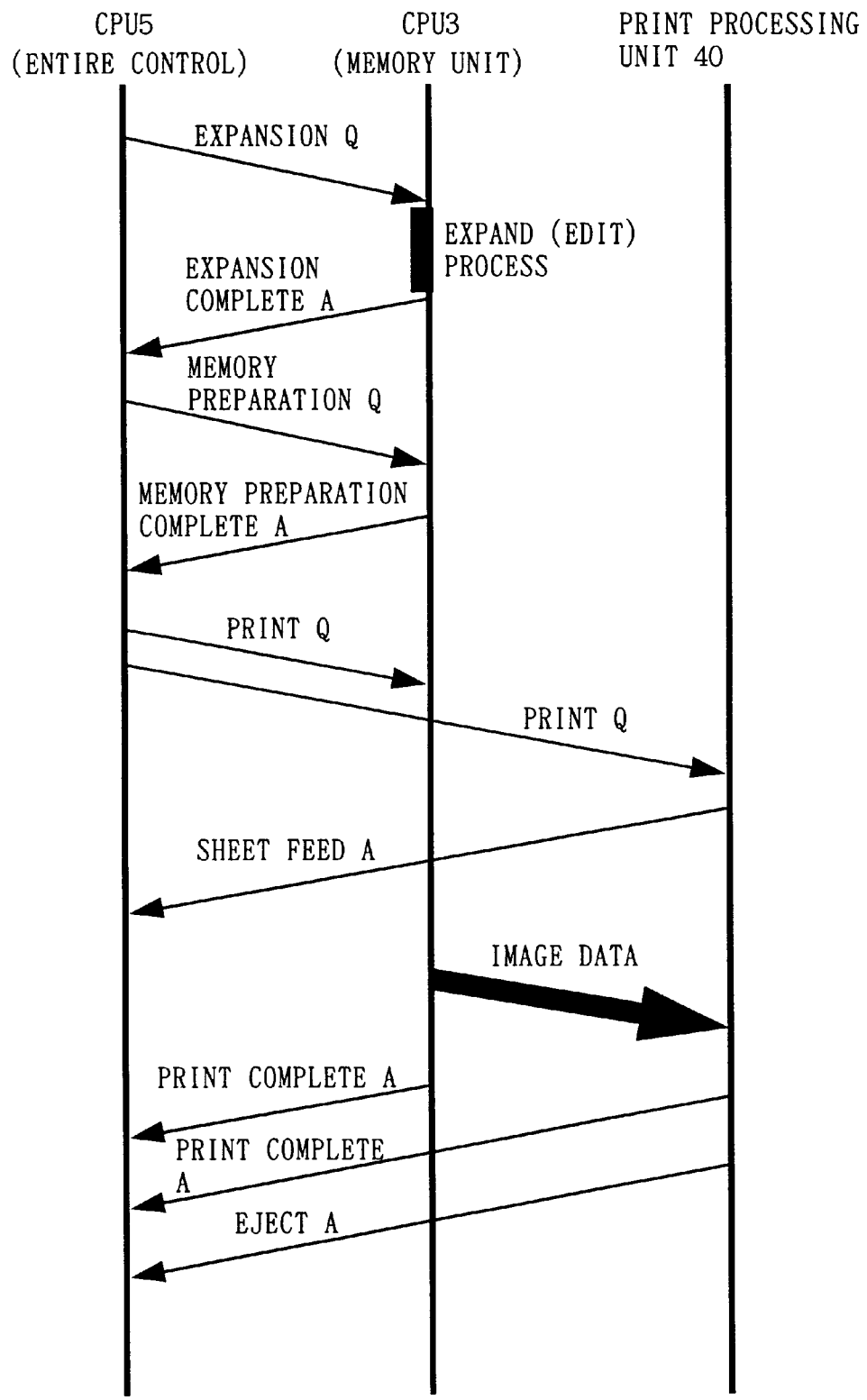
FIG. 10 shows an operation sequence in a memory read operation.

FIG. 10 shows a schematic sequence of a memory read out operation.

In a memory read out operation, image data is read out from image memory 304. A copy image is printed out on a sheet according to the image data.

Referring to FIG. 10, CPU 5 sends a data expansion request to CPU 3. CPU 3 sets the readout address from code memory 306, the data amount, the write address to image memory 304, the XY length information, the mode of expander 312 (for example, the arithmetic coding method or MH method), the editing process mode such as rotation, and the like to actuate a relevant component. Thus, an expand process is carried out, whereby image data is written into image memory 304.

When the expand process ends, a complete report is sent from CPU 3 to CPU 5. Then, CPU 5 sends a memory preparation request to CPU 3 in order to read out image data from image memory 304. In response, CPU 3 specifies various settings with respect to the internal hardware such as the bus connection state to output image data from image memory 304 to print processing unit 40, the head address of the readout region of image memory 304, the XY length information, and the like.

When these settings end and a preparation complete notification is received by CPU 5, CPU 5 sends a print request to CPU 3 and print processing unit 40. A sheet feed report indicating the sheet transportation state is sent from print processing unit 40 to CPU 5. Then, image data read out from image memory 304 is output to print processing unit 40 to be printed out.

Upon completion of the print operation, CPU 3 and print processing unit 40 send a print completion report and an eject completion report to CPU 5. CPU 5 receiving these reports sends a memory clear request, as necessary, to CPU 3.

Figure 11:
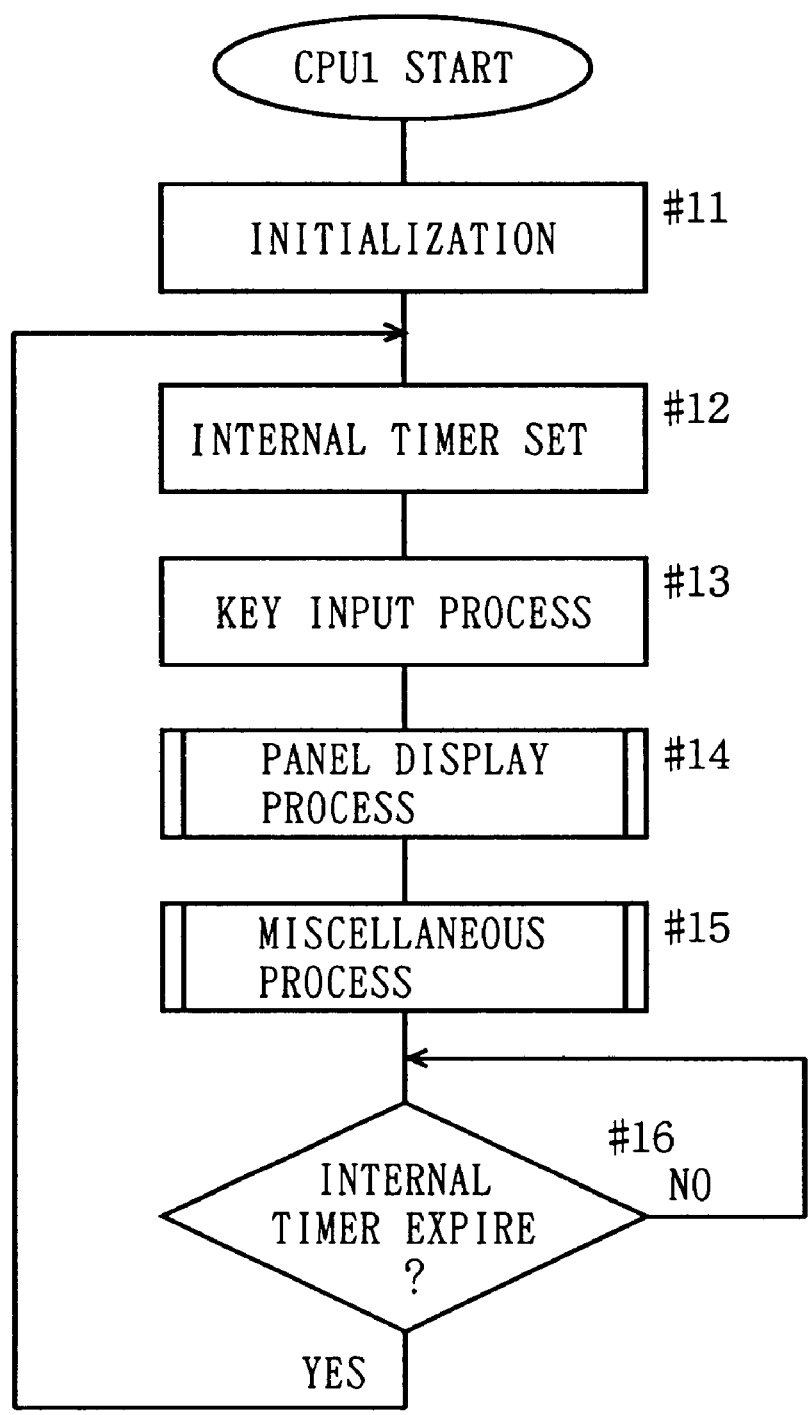
FIGS. 11, 12, 13, and 14 are main flow charts of a CPU1, a CPU3, a CPU4, and a CPU5, respectively.

FIG. 11 is a main flow chart of CPU 1 that provides control of the operation panel.

Referring to FIG. 11, when the power is turned on, CPU 1 executes initialization to initialize the RAM, the register, and the like (#11). Then, an internal timer defining the length of one routine is set (#12). A key input process receiving a key operation (#13), a panel display process providing a display according to the key input (#14), and a miscellaneous process (#15) are carried out. Then, expiration of an internal timer is detected. The processes of #12–#16 are carried out repeatedly. Furthermore, communication with another CPU is effected appropriately as an interruption process. The details of the panel display process (#14) and the miscellaneous process (#15) will be described afterwards.

Figure 12:
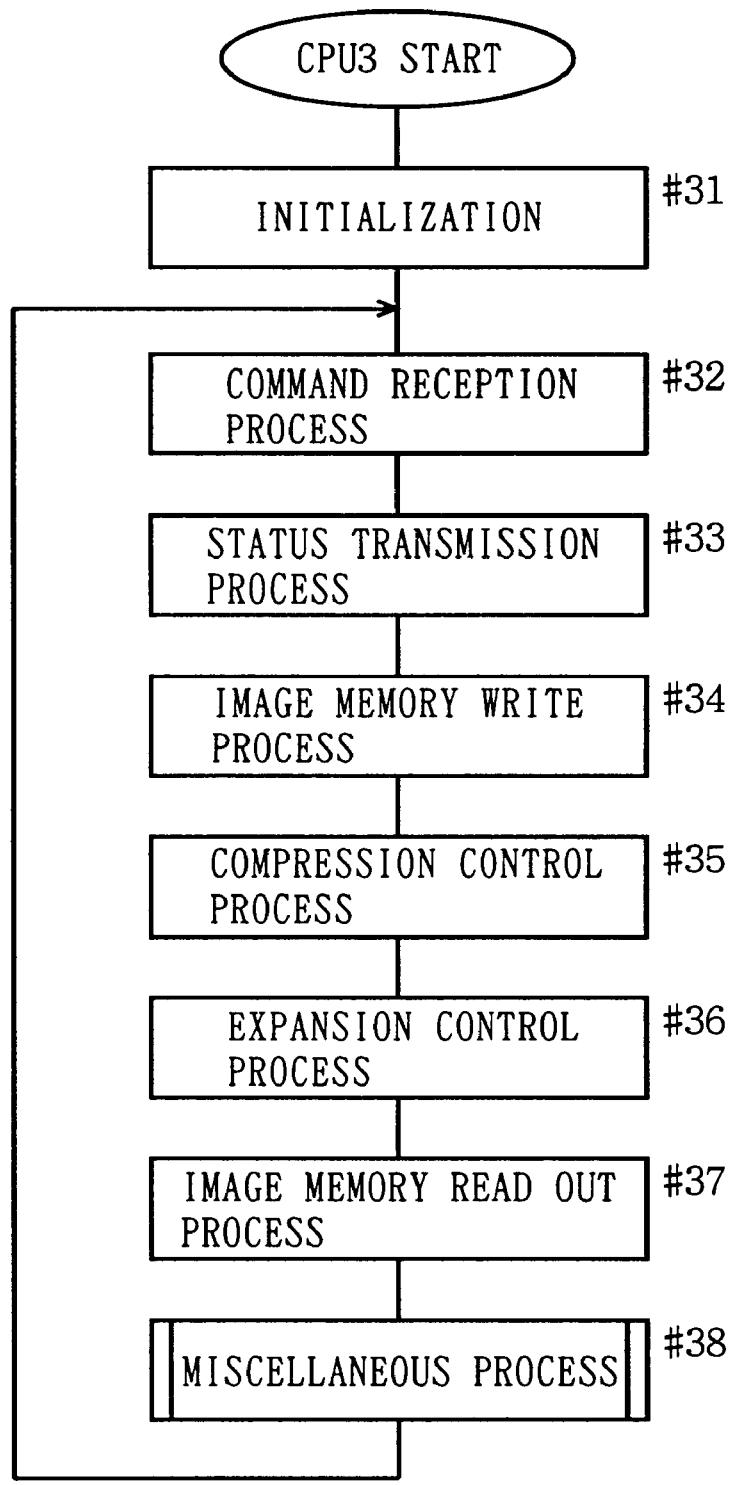

FIG. 12 is a main flow chart of CPU 3 providing control of memory unit 30.

Following the execution of the initial setting process (#31), CPU 3 repeatedly executes the command reception process (#32), the status transmission process (#33), the image memory write process (#34), the compress control process (#35), the expand control process (#36), the image memory read out process (#37) and the miscellaneous process (#38).

Figure 13:
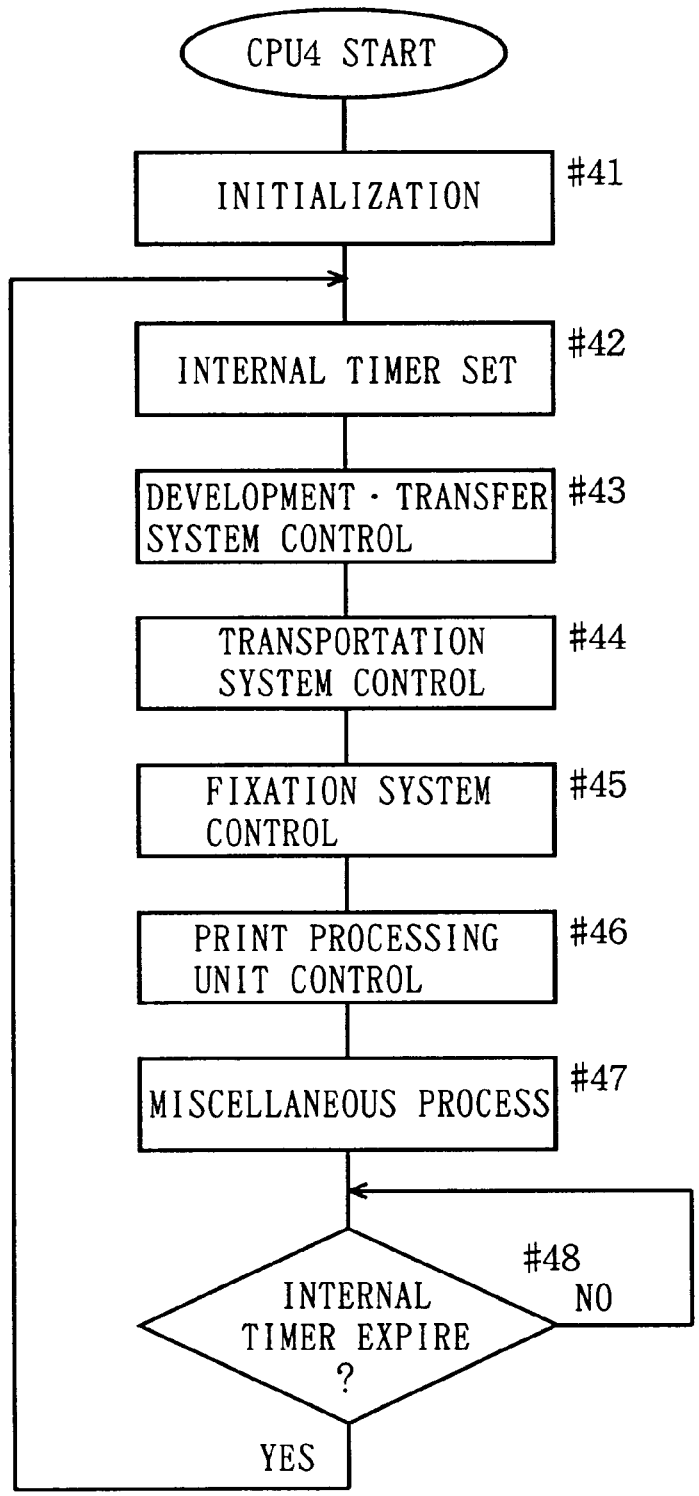

FIG. 13 is a main flow chart of a CPU 4 providing control of printer unit P.

Following the initialization (#41), CPU 4 repeatedly executes the processes of setting an internal timer (#42), controlling the development and transfer system (#43), controlling the transportation system (#44), controlling the fix system (#45), controlling the print processing unit (#46), the miscellaneous process (#47), and detecting the expiration of the internal timer (#48).

Figure 14:
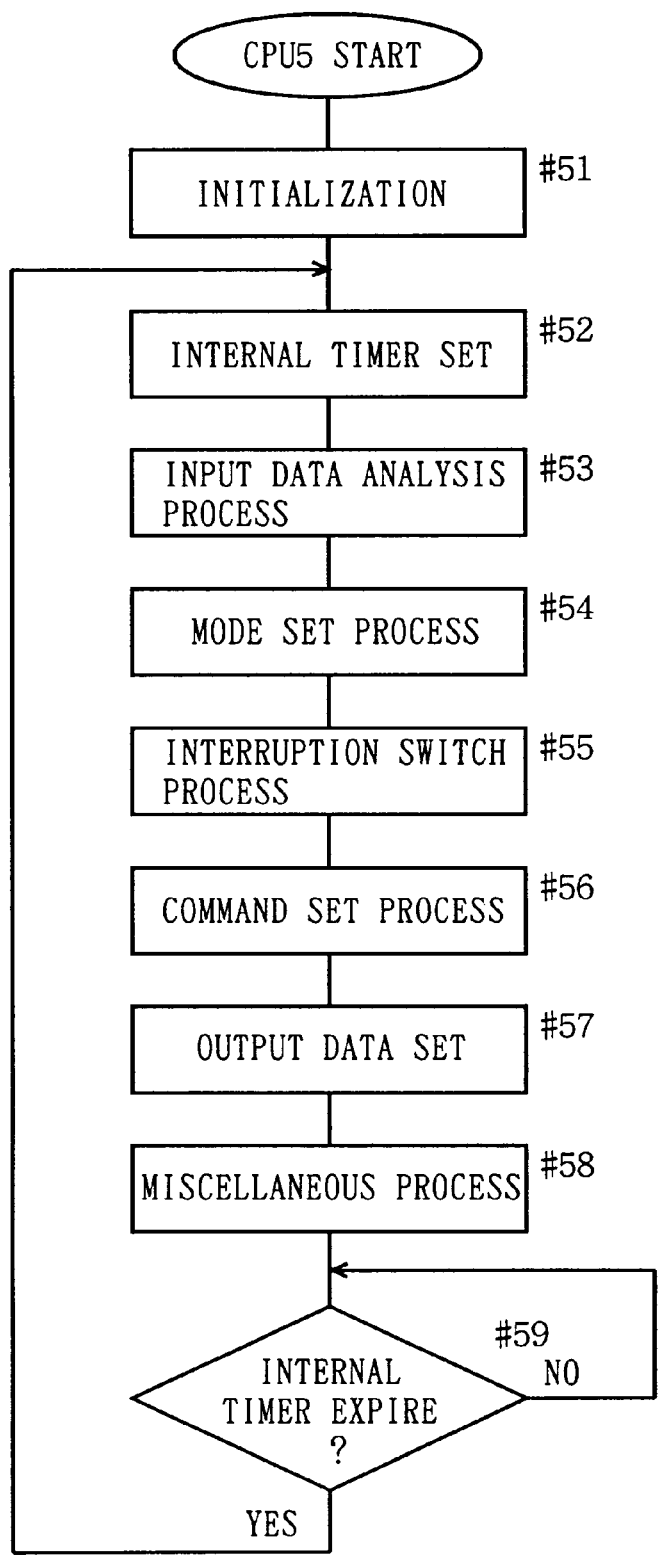

FIG. 14 is the main flow of CPU 5 providing the overall control of the copy machine.

Following the initialization (#51), CPU 5 repeatedly executes the processes of setting an internal timer (#52), the input data analysis process of checking input data from another CPU (#53), the mode set process of determining the operation mode (#54), the interruption switch process (#55), the command set process according to the mode (#56), output data setting for a command to queue at the communication port (#57), the miscellaneous process (#58), and detecting the expiration of the internal timer (#59).

Figure 15:
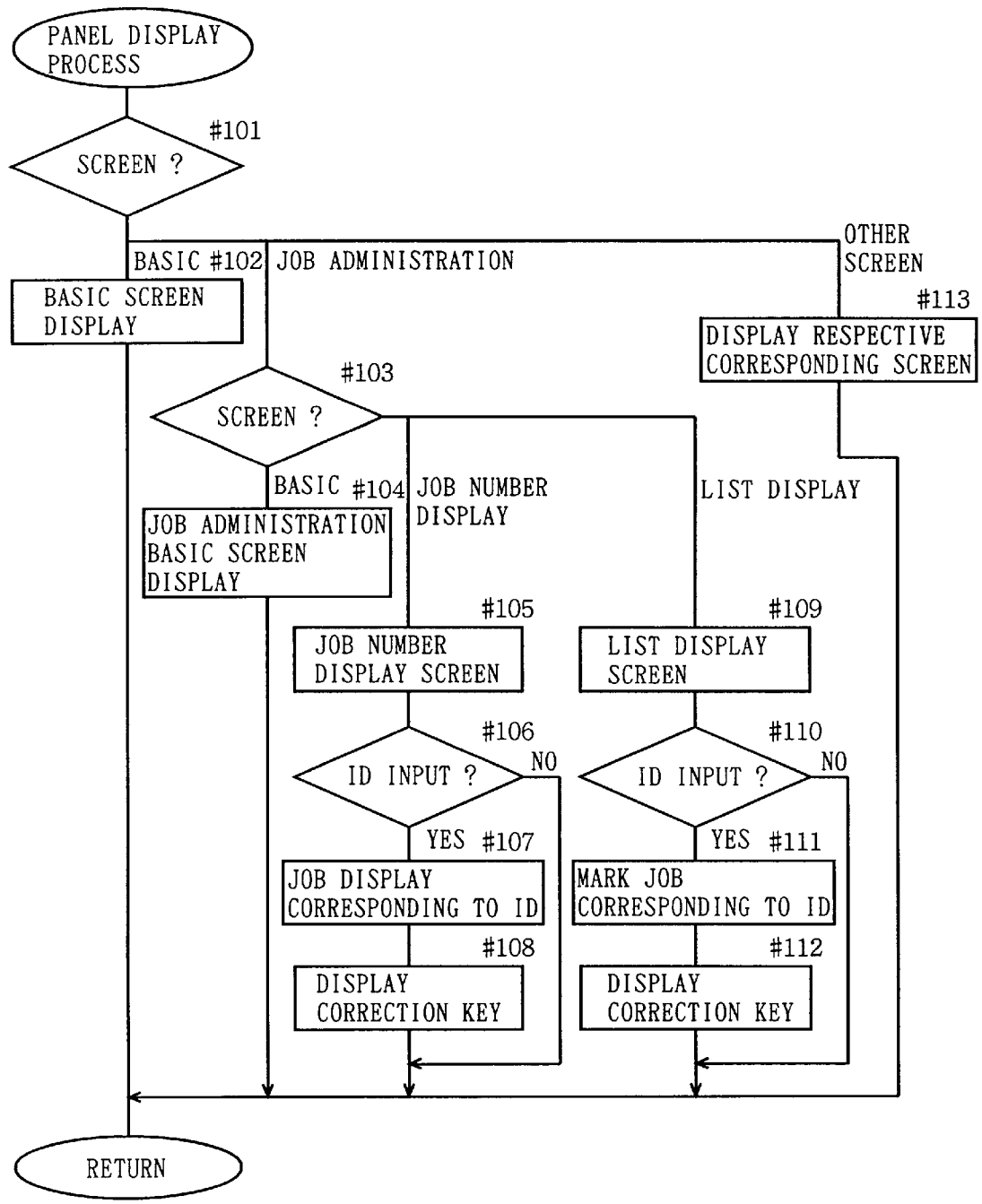
FIG. 15 is a flow chart of the panel display process (#14) of FIG. 11.

FIG. 15 is a flow chart of the panel display process (#14) of FIG. 11.

Referring to FIG. 15, determination of what screen is to be displayed on liquid crystal touch panel 201 is made at step #101. If the screen to be displayed is the basic screen, the program proceeds to step #102 to provide a basic screen display.

When the screen to be displayed is a job administration screen at step #101, the program proceeds to step #103 to determine which screen of the job administration screen is to be displayed. When the screen to be 30 displayed is the job administration basic screen, the program proceeds to step #104 to provide a job administration basic screen display.

When determination is made that the screen to be displayed is a job number display screen at step #103, the program proceeds to step #105 to display a job number display screen. When determination is made that an ID code is input through ten-key 202 or by an ID card 212 at step #106, the program proceeds to step #107 to display a registered job corresponding to the ID code. At step #108, a correction key is displayed on liquid crystal touch panel 201.

The user can correct the task content of the job corresponding to that ID code by depressing this correction key.

When determination is made that the screen to be displayed is a list display screen at step #103, the program proceeds to step #109 to provide a list of registered jobs on liquid crystal touch panel 201. At step #110, determination is made whether an ID code is input. When YES, the program proceeds to step #111 to mark a displayed job corresponding to that ID code. Then, the program proceeds to step #112 to provide a correction key display.

When determination is made that the screen to be displayed is the miscellaneous screen at step #101, the program proceeds to step #113 to display a corresponding screen.

Figure 16:
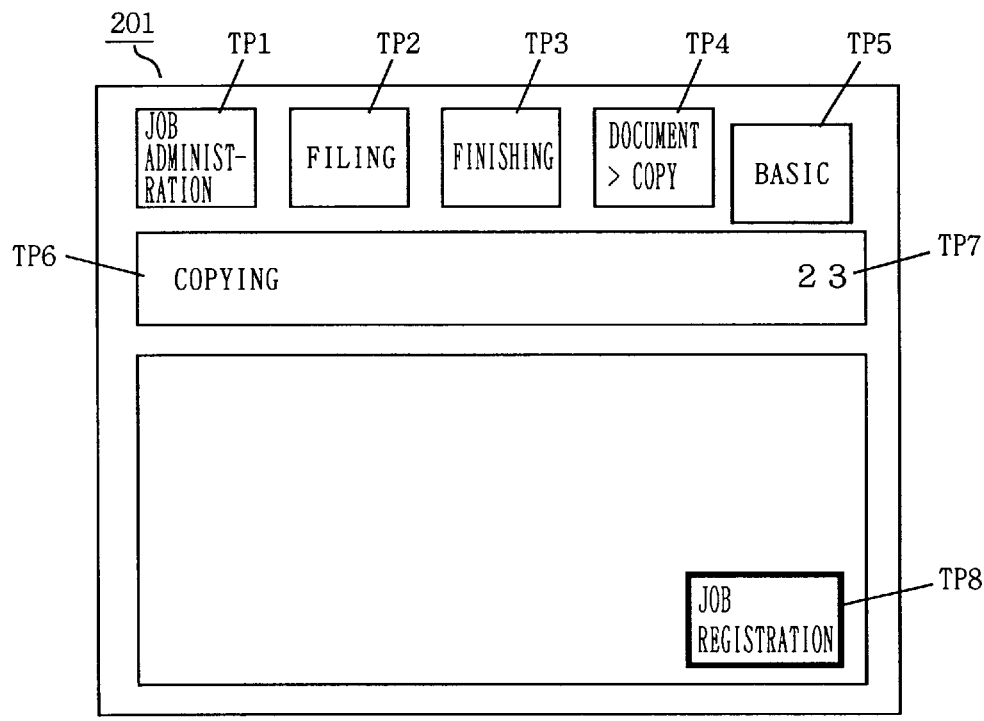
FIG. 16 shows a basic screen.

FIG. 16 shows the basic screen displayed at step #102 of FIG. 15.

Referring to FIG. 16, a job administration key TP1, a filing key TP2, a finish key TP3, a document→copy key TP4, a basic key TP5, a message display unit TP6, a number of copies display TP7, and a job registration key TP8 are displayed on the basic screen.

In response to the user depressing job administration key TP1, a job administration basic screen that will be described afterwards is displayed on liquid crystal touch panel 201. By depressing job registration key TP8, read out of new image data is carried out. The user inputs the task content (number of copies, copy magnification scale, and the like) to register a new job. The process corresponding to the key input is carried out at step #13 of FIG. 11.

Figure 17:
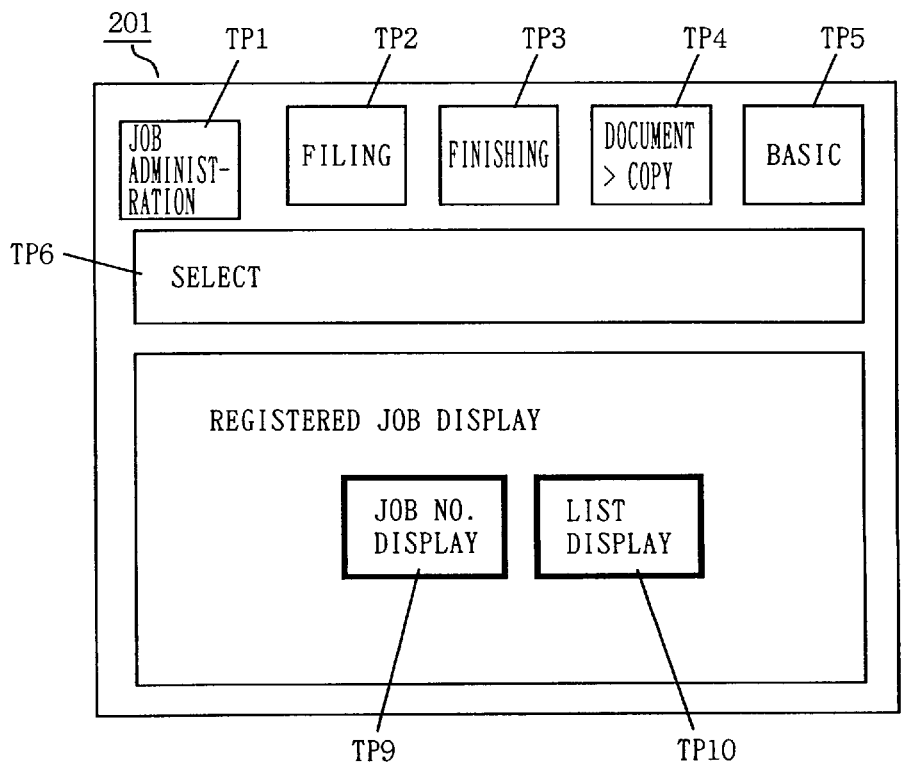
FIG. 17 shows a job administration basic screen.

FIG. 17 shows a job administration basic screen displayed at #104 of FIG. 15.

Referring to FIG. 17, a job number display key TP9 and a list display key TP10 are indicated on the job administration basic screen. By depressing respective keys, a registered job can be provided on the display. By depressing basic key TP5, the screen of FIG. 16 is provided on liquid crystal touch panel 201.

Figure 18:
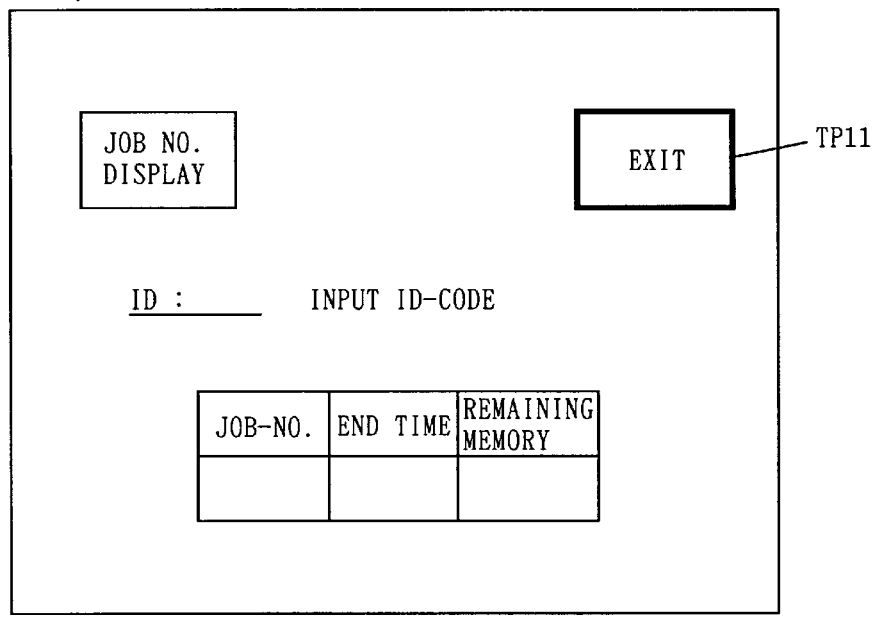
FIG. 18 shows a job number display screen.

FIG. 18 shows a job number display screen provided at step #105 of FIG. 15.

Referring to FIG. 15, a display prompting input of an ID code appears on the job number display screen. Also, an EXIT key TP11 is displayed on this screen. The screen display returns to the job administration basic screen when exit key TP11 is depressed.

Figure 19:
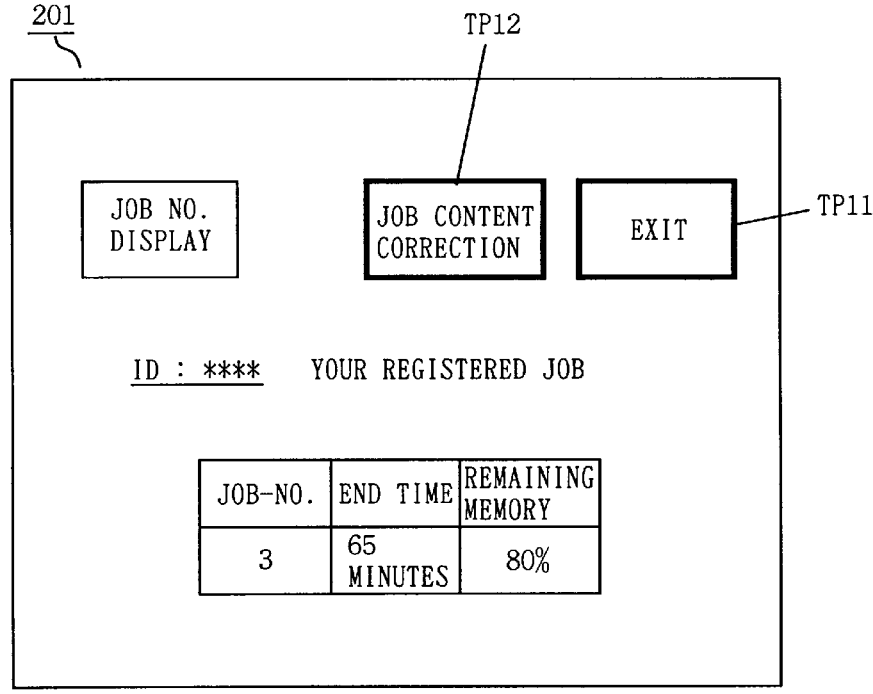
FIG. 19 shows an input state of an ID code from the state of FIG. 18.

FIG. 19 shows the state when an ID code is input subsequent to the state of FIG. 18.

In this case, the input ID code is displayed. The number of a registered job (JOB-No.) corresponding to the input ID code, the end time of that job, and the remaining amount of memory when that job is executed are provided on the screen. Also, a job content correction key TP12 appears on the screen. By depressing job content correction key TP12, the task content of the currently displayed job (number of copies, sheet size, magnification, and other mode) can be corrected.

FIG. 20 shows the form of a job administration table for supervising the registered jobs.

Referring to FIG. 20, the registration number of a job (registration number), image data capacity of that job CAPA(n), the time required to execute that job TIME(n), the time until the currently-executed job ends REST(n), the time starting from the current time to the end of respective jobs TSUM(n), the amount of image data recorded in the memory CSUM(n), the available capacity of the memory SPACE(n), and the ID code of the person who registered that job ID(n) are registered for each job in the job administration table.

In the screen of FIG. 19, the registration number of the job corresponding to the input ID code, the value of variable TSUM(n), and the value of variable SPACE(n) are provided.

Figure 21:
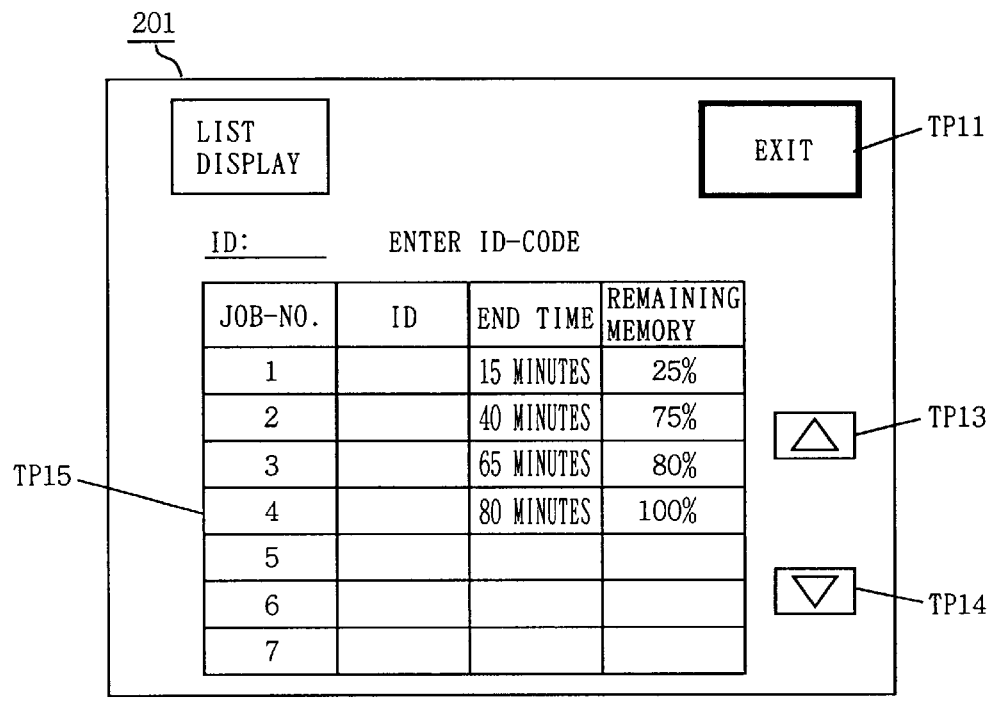
FIG. 21 shows a screen displaying a list of registered jobs.

FIG. 21 shows a list display screen appearing at step #109 of FIG. 15.

Referring to FIG. 21, a display TP15 of a list of registered jobs appears on the screen. Also, an up key TP13 and a down key TP14 are provided for scrolling through job list display TP15.

In this screen, the registration numbers of all the jobs registered in the job administration table of FIG. 20, the value of variable TSUM(n), and the value of variable SPACE(n) are indicated in job list display TP15. However, the value of ID(n) is not displayed. Therefore, the user cannot specifically identify which job he/she has registered.

Figure 22:
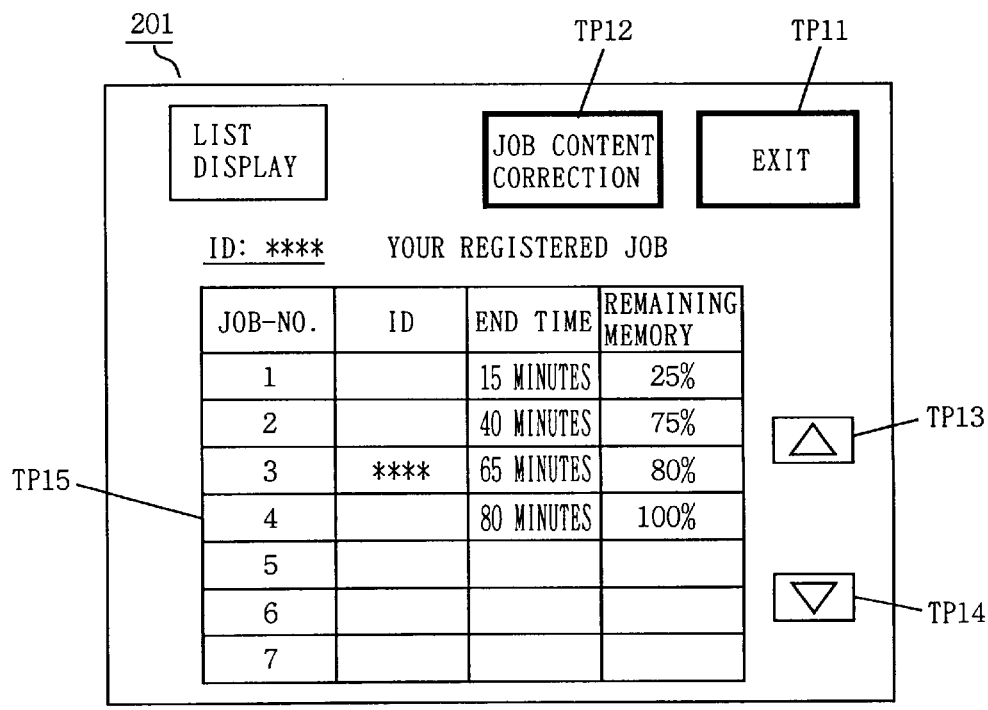
FIG. 22 shows an input state of an ID code from the state of FIG. 21.

When an ID is input under the state of FIG. 21, a screen of FIG. 22 is provided.

Referring to FIG. 22, the ID code input at the position of a job corresponding to the ID code input on job list display TP15 is shown on liquid crystal touch panel 201. Therefore, the user can easily identify the ending time of his/her own registered job.

In the state where an ID code is entered, job content correction key TP1 appears on liquid crystal touch panel 201. Therefore, the user can correct the contents of the registered job for execution.

Figure 23:
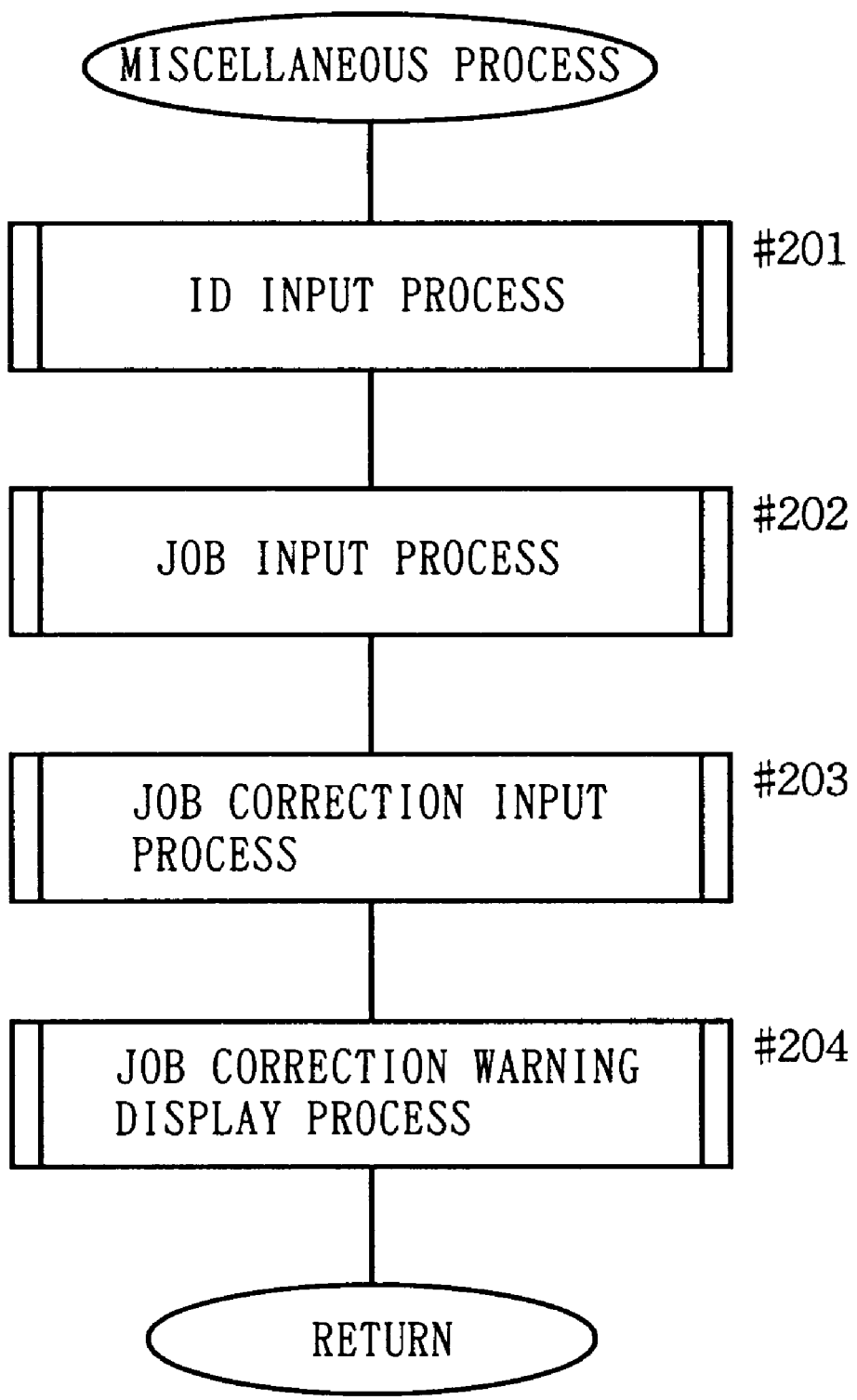
FIG. 23 is a flow chart of the miscellaneous process (#15) of FIG. 11.

FIG. 23 is a flow chart showing the process of the miscellaneous process (#15) of FIG. 11.

Referring to FIG. 23, a process corresponding to an input of an ID code is carried out at step #201. Then, the program proceeds to step #202 to carry out a process for entering a new job. At step #203, a process of correcting the content of a registered job is carried out. At step #204, a process of displaying a warning is carried out when the correction of a registered job is inconvenient.

Figure 24:
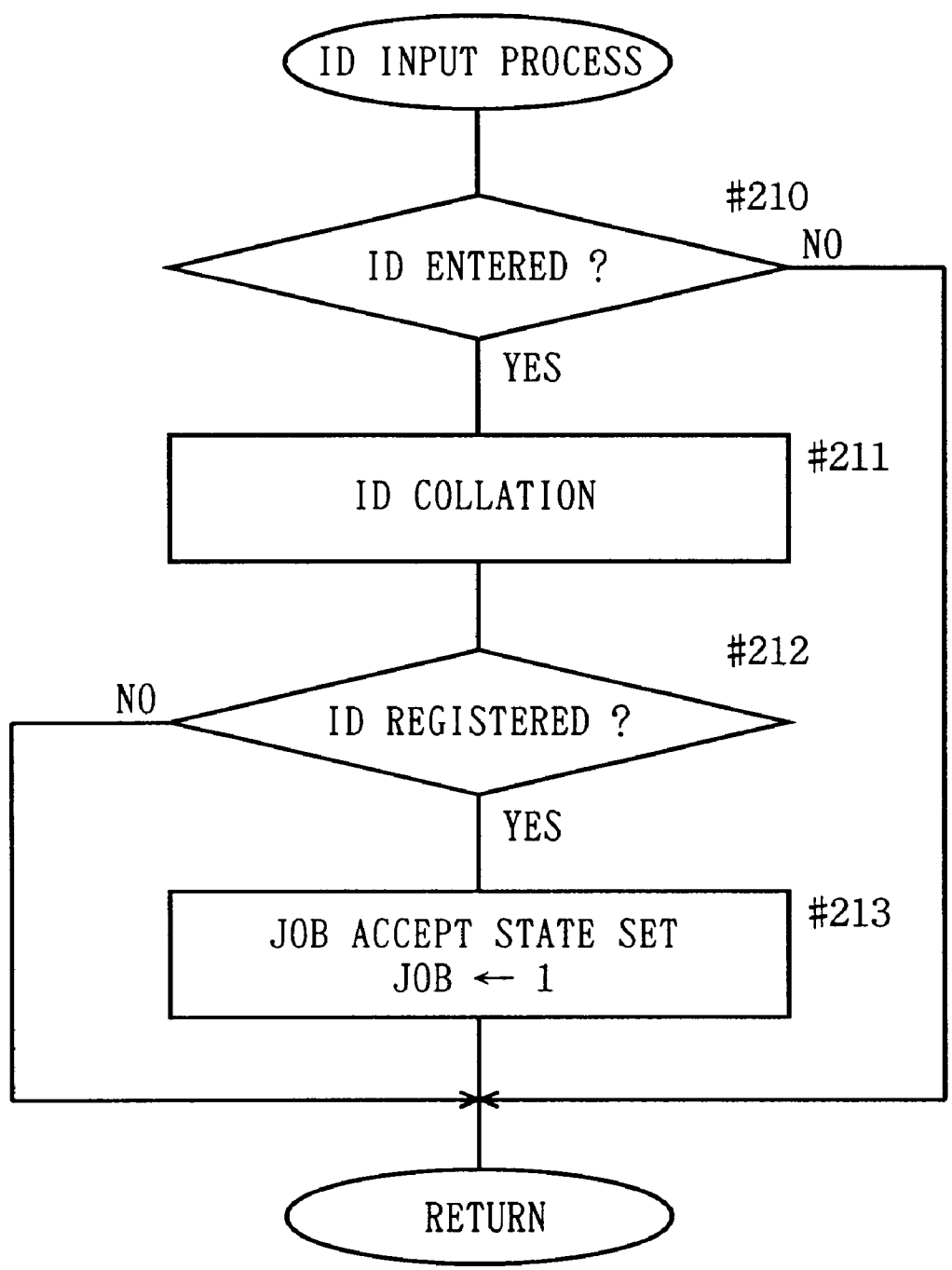
FIG. 24 is a flow chart of the ID input process (#201) of FIG. 23.

FIG. 24 is a flow chart showing the contents of the ID input process (#201) of FIG. 23.

Referring to FIG. 24, determination is made whether an ID code is input through an ID card or a ten-key 202 at step #210. When YES, the input ID code is collated at step #211. At step #212, determination is made whether that ID code is a code of a user that is permitted to use the copy machine.

When YES at step #212, the program proceeds to step #213 to set a flag JOB indicating the job accept state to "1".

When NO at step #210 or #212, the program returns.

Figure 25:
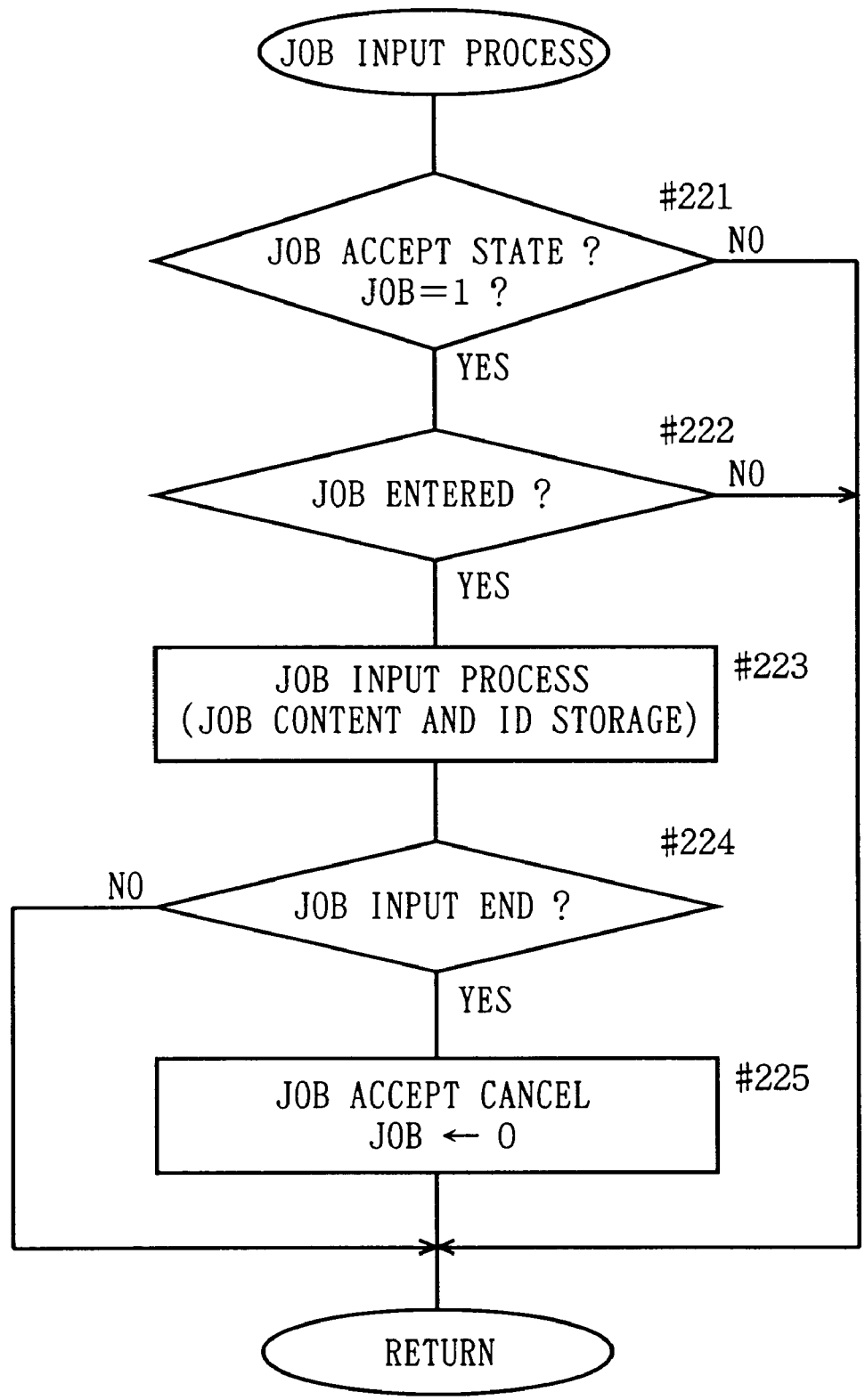
FIG. 25 is a flow chart of the job input process (#202) of FIG. 23.

FIG. 25 is a flow chart showing the contents of the job input process (#202) of FIG. 23.

Referring to FIG. 25, determination is made whether flag JOB indicating the job accept state is "1" or not at step #221. When YES, determination is made whether a new job is input at step #222. A new job input is registration of a new job by depressing job registration key TP8 of FIG. 16.

When YES at step #222, the program proceeds to step #223 to carry out the input process of a new job. More specifically, image data of the new job, the processing content (number of copies, copy magnification, sheet size, mode and the like), and the ID code of the operator registering the new job are stored.

At step #224, determination is made whether input of a new job is completed or not. When YES, the program proceeds to step #225 to set the value of flag JOB indicating the job accept state to "0". Then, the program returns.

When NO at any of steps #221, #222, and #224, the program returns.

Figure 26:
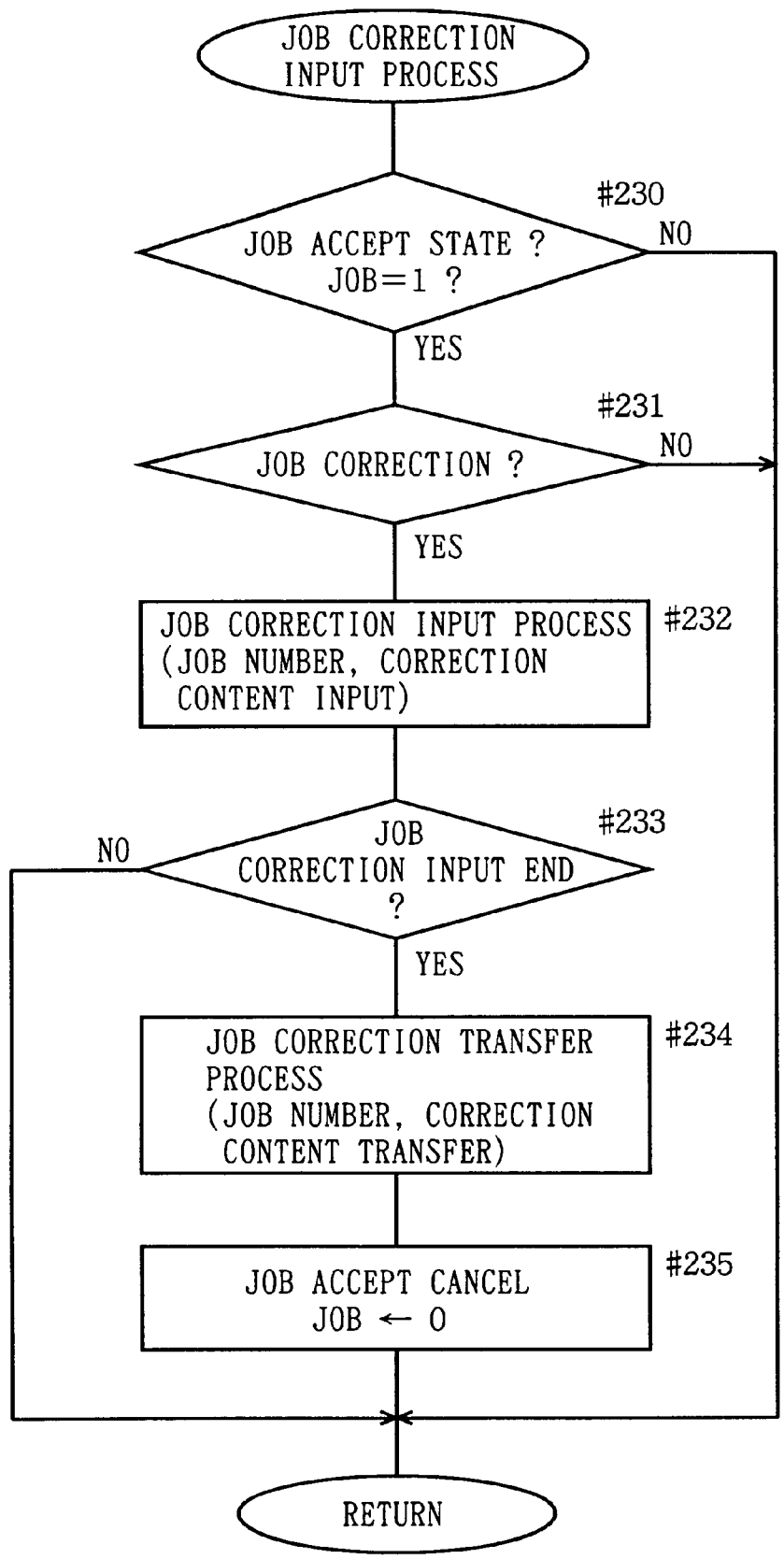
FIG. 26 is a flow chart of the job correction input process (#203) of FIG. 23.

FIG. 26 is a flow chart showing the contents of the job correction input process (#203) of FIG. 23.

Referring to FIG. 26, determination is made whether flag JOB indicating the job accept state is "1" or not at step #230. When YES at step #230, the program proceeds to step #231 to determine whether there is a job correction by job content correction key TP12. When YES at step #231, the program proceeds to step #232 to carry out a process of correcting the content of a registered job corresponding to the ID code. More specifically, an input process of the number of copies, copy magnification rate, sheet size, mode, and the like is effected.

At step #233, determination is made whether input of a job correction is completed or not. When YES, the program proceeds to step #234 to carry out a process of transferring the corrected contents to CPU 3.

Then, the program proceeds to #235 to set the value of flag JOB indicating the job accept state to "0". Then, the program returns.

When NO at any one of steps #230, #231, and #233, the program returns.

CPU 3 confirms the content of the corrected job transferred by step #234 of FIG. 26 to determine whether the corrected content is appropriate or not. When determination is made that the corrected content is improper, a warning is issued to CPU 1. Such an operation of CPU 3 will be described afterwards.

Figure 27:
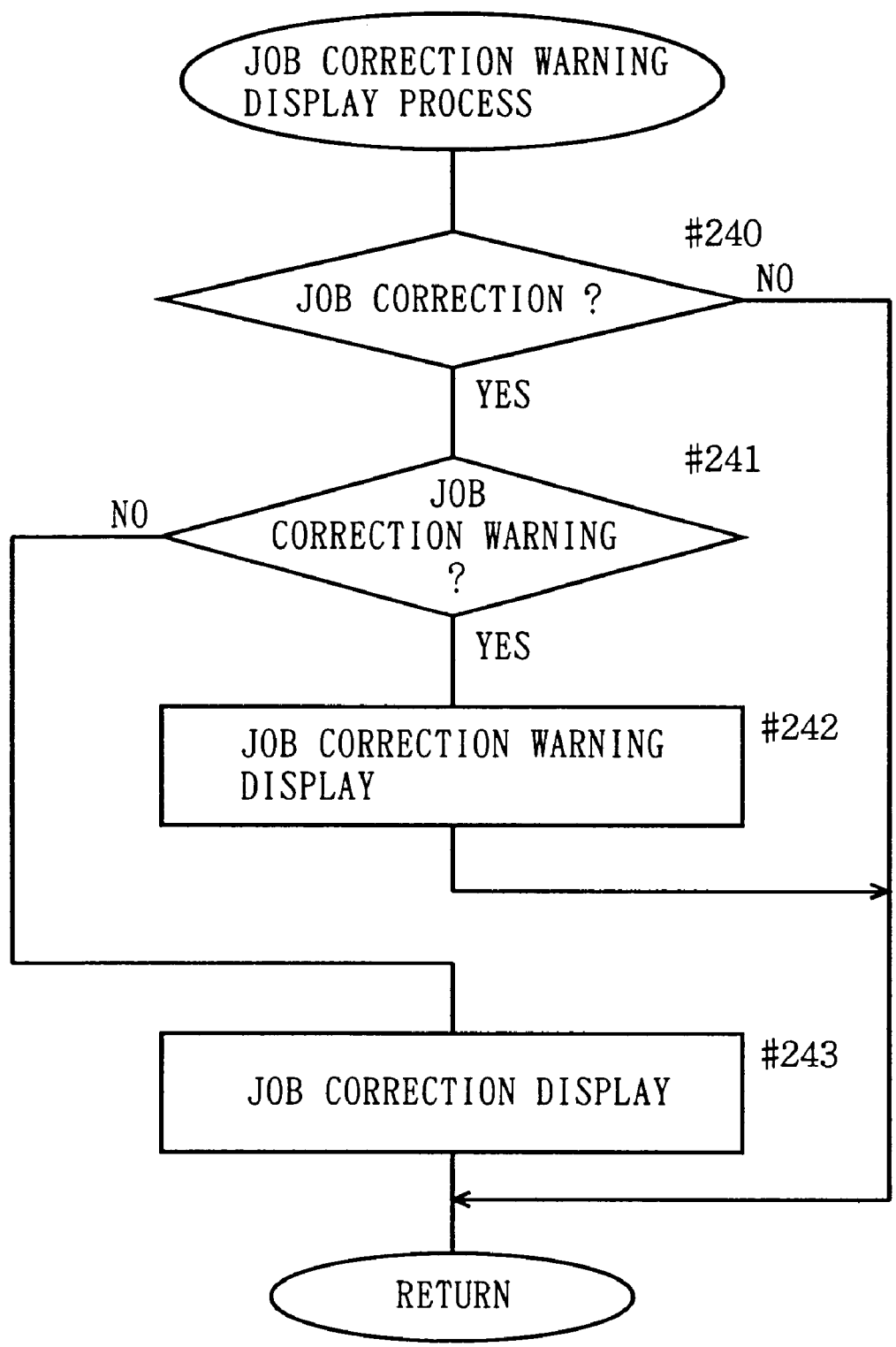
FIG. 27 is a flow chart of the job correction warning display process (#204) of FIG. 23.

FIG. 27 is a flow chart showing the contents of the job correction warning display process (#204) of FIG. 23.

Referring to FIG. 27, determination is made whether the job content is corrected or not at step #240. When YES, the program proceeds to step #241 to determine whether a warning is issued associated with the correction of the job content from CPU 3. When YES, the program proceeds to step #242 to display a warning on liquid crystal touch panel 201. Then, the program returns.

When NO at step #241, completion of the job correction is displayed on liquid crystal touch panel 201. Then, the program returns.

When NO at #240, the program returns.

Figure 28:
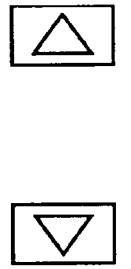
FIG. 28 shows a screen displaying a warning for job correction.

FIG. 28 shows a message displayed on liquid crystal touch panel 201 according to the job correction warning display (#242) of FIG. 27.

When the job content is corrected in the present embodiment, determination is made whether the time required to execute the corrected job is prolonged than that prior to correction. When the corrected job requires a longer period of time, the process of the corrected job is set as the last job. As a result, inconvenience that the ending time of a job registered by another user being delayed from a predetermined time will not occur.

Referring to FIG. 28, a message is displayed indicating that the process of the corrected job is set as the last job in liquid crystal touch panel 201.

Figure 29:
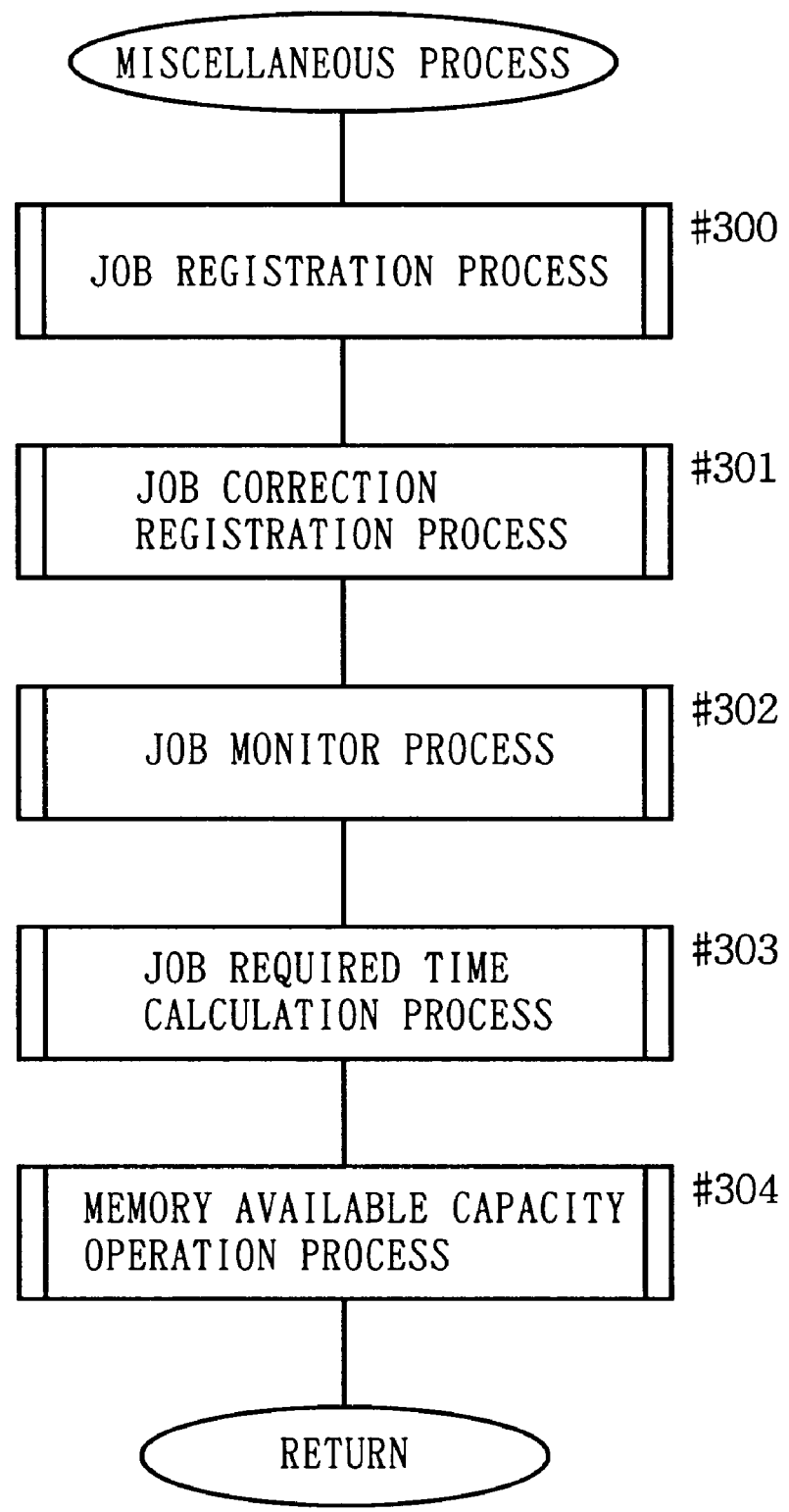
FIG. 29 is a flow chart of the miscellaneous process (#38) of FIG. 12.

FIG. 29 is a flow chart showing the contents of the miscellaneous process (#38) of CPU 3 of FIG. 12.

Referring to FIG. 29, a registration process of a new job is carried out at step #300. At step #301, a process of correcting a job that is already registered is carried out. At step #302, a process of monitoring a currently-executed job is carried out. At step #303, a process is canied out to calculate the time required for the registered job and the ending time. At step #304, a process of calculating the available capacity in the memory is carried out.

Figure 30:
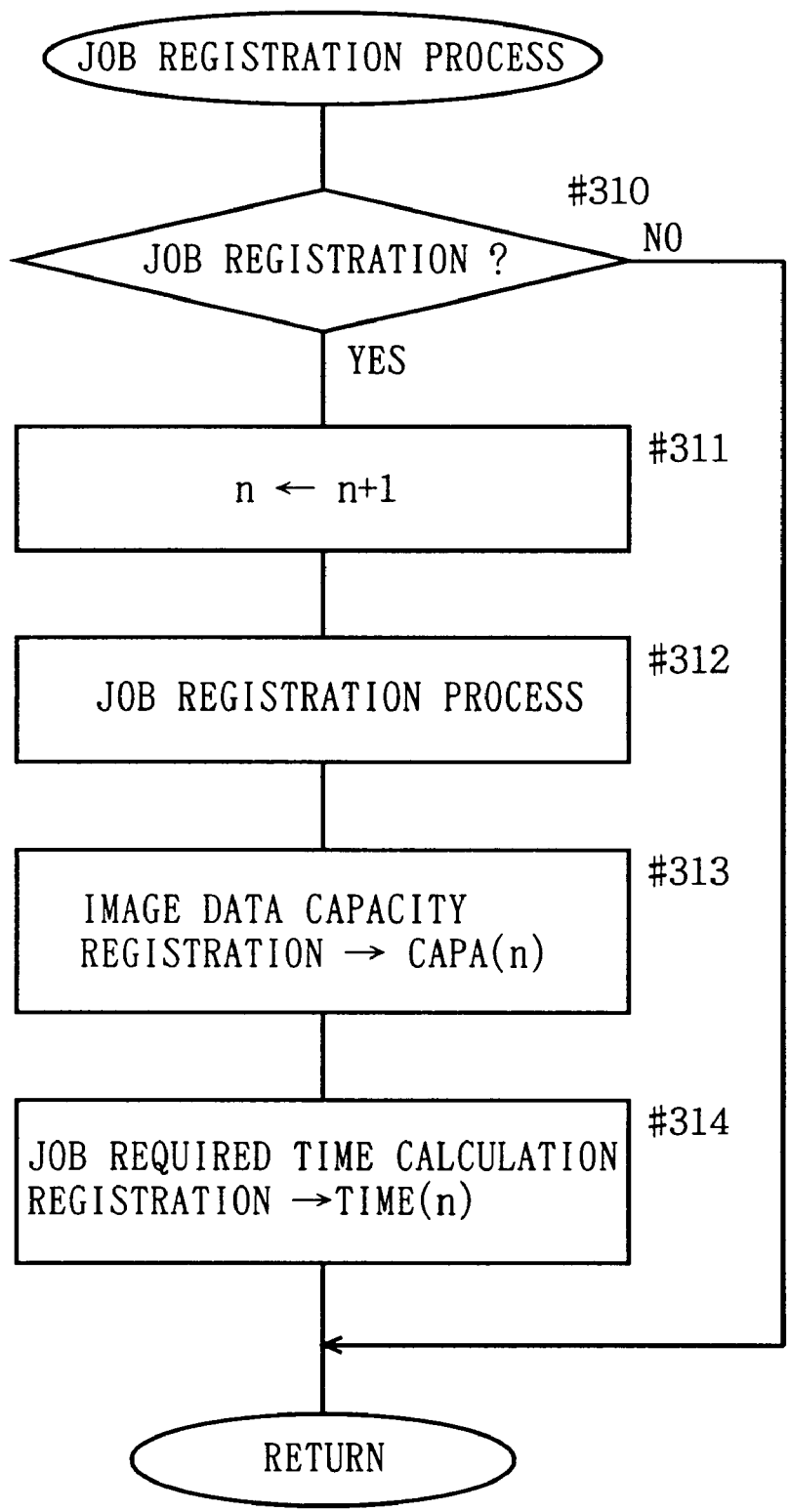
FIG. 30 is a flow chart of the job registration process (#300) of FIG. 29.

FIG. 30 is a flow chart showing the contents of the job registration process (#300) of FIG. 29.

Refering to FIG. 30, determination is made whether a new job is registered or not at step #310. When YES, the program proceeds to step #311 to increment by 1 the variable n indicating the last registration number of the registered job at step #311. At step #312, a process of registering a new job is carried out. At step #313, the capacity of the image data of the new job is stored in variable CAPA(n). At step #314, the time required to execute that job is stored in variable TIME(n).

When NO at step #310, the program returns.

Figure 31:
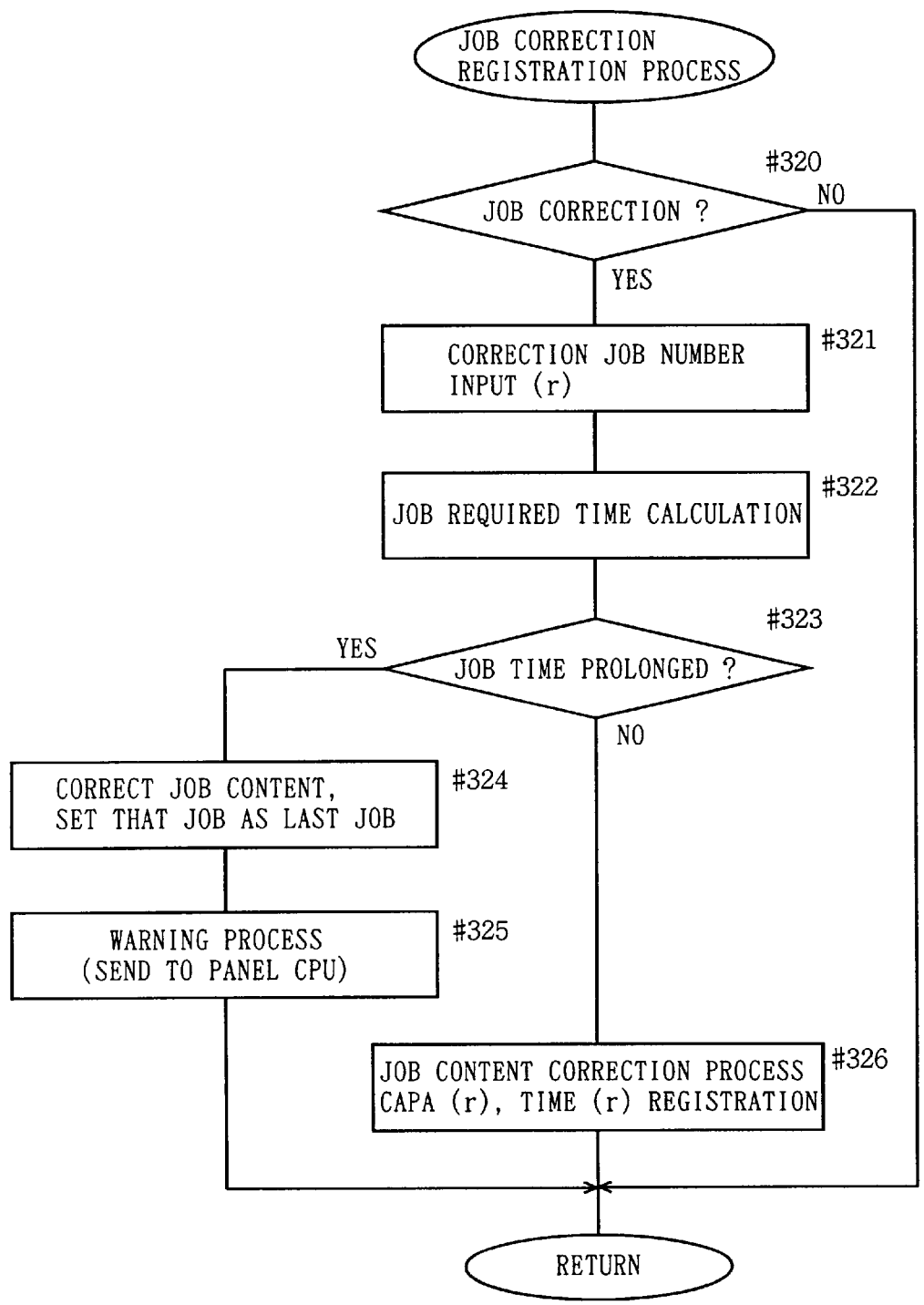
FIG. 31 is a flow chart of the job correction registration process (#30 1) of FIG. 29.

FIG. 31 is a flow chart showing the contents of the job correction registration process (#301) of FIG. 29.

Referring to FIG. 31, determination is made whether the registered job is corrected or not at step #320. When YES, the program proceeds to step #321 to obtain a registration number r of a job to be corrected from the ID code and the like. At step #322, the time required to execute the corrected job is calculated. At step #323, determination is made whether the time required for the corrected job is prolonged or not. When YES, the program proceeds to step #324 to set the job having a longer processing time as the last job. At step #325, a warning is issued to CPU 1.

When NO at step #323, a process of correcting the content of a job is carried out at step #326. The values of variables CAPA(r) and TIME(r) are newly registered.

When NO at step #320, the program returns.

Figure 32:
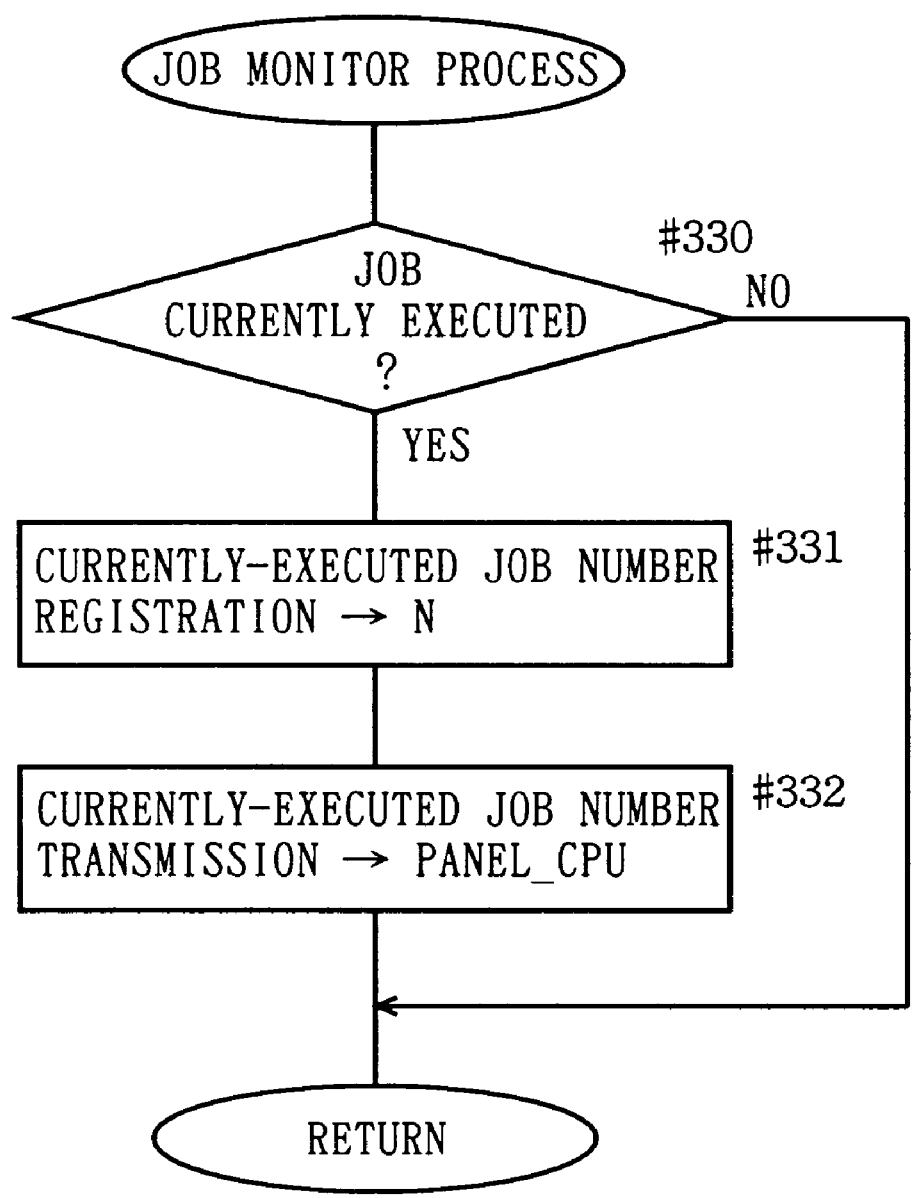
FIG. 32 is a flow chart of the job monitor process (#302) of FIG. 29.

FIG. 32 is a flow chart showing the contents of the job monitor process (#302) of FIG. 29.

Referring to FIG. 32, determination is made whether a job is currently executed at step #330. When YES, the program proceeds to step #331 to register the registration number of the currently-executed job to variable N.

At step #332, the value of variable N is sent to CPU 1.

When No at step #330, the program returns.

Figure 33:
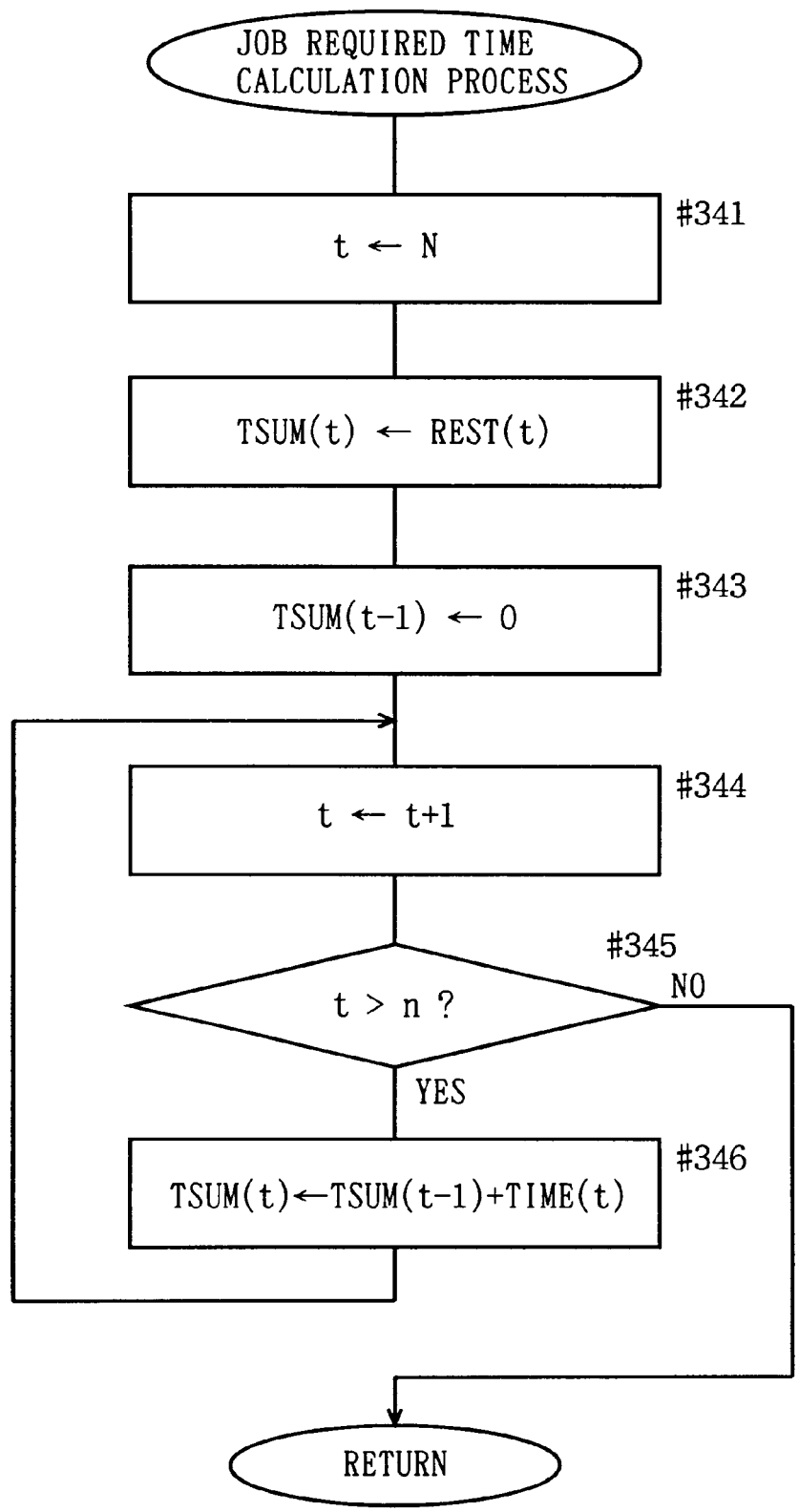
FIG. 33 is a flow chart of the job required time calculation process (#303) of FIG. 29.

FIG. 33 is a flow chart showing the contents of the job required time calculation process (#303) of FIG. 29.

Referring to FIG. 33, the in-process job number N is substituted for variable t at step #341. At step #342, the value of variable REST(t) is substituted for variable TSUM(t) (refer to FIG. 20).

At step #343, the value of variable TSUM(t-1) is set to 0. At step #344, the value of variable t is incremented by 1. At step #345, determination is made whether the value of variable T exceeds the value of variable n. When YES, the program proceeds to step #346 to substitute the value of TSUM(t-1)+TIME(t) for the value of variable TSUM(t). Then, the process from steps #344 and et seq. is repeated.

When NO at step #345, the program returns.

By the above process, the value of TSUM(n) of each job can be obtained to identify the ending time of each job.

Figure 34:
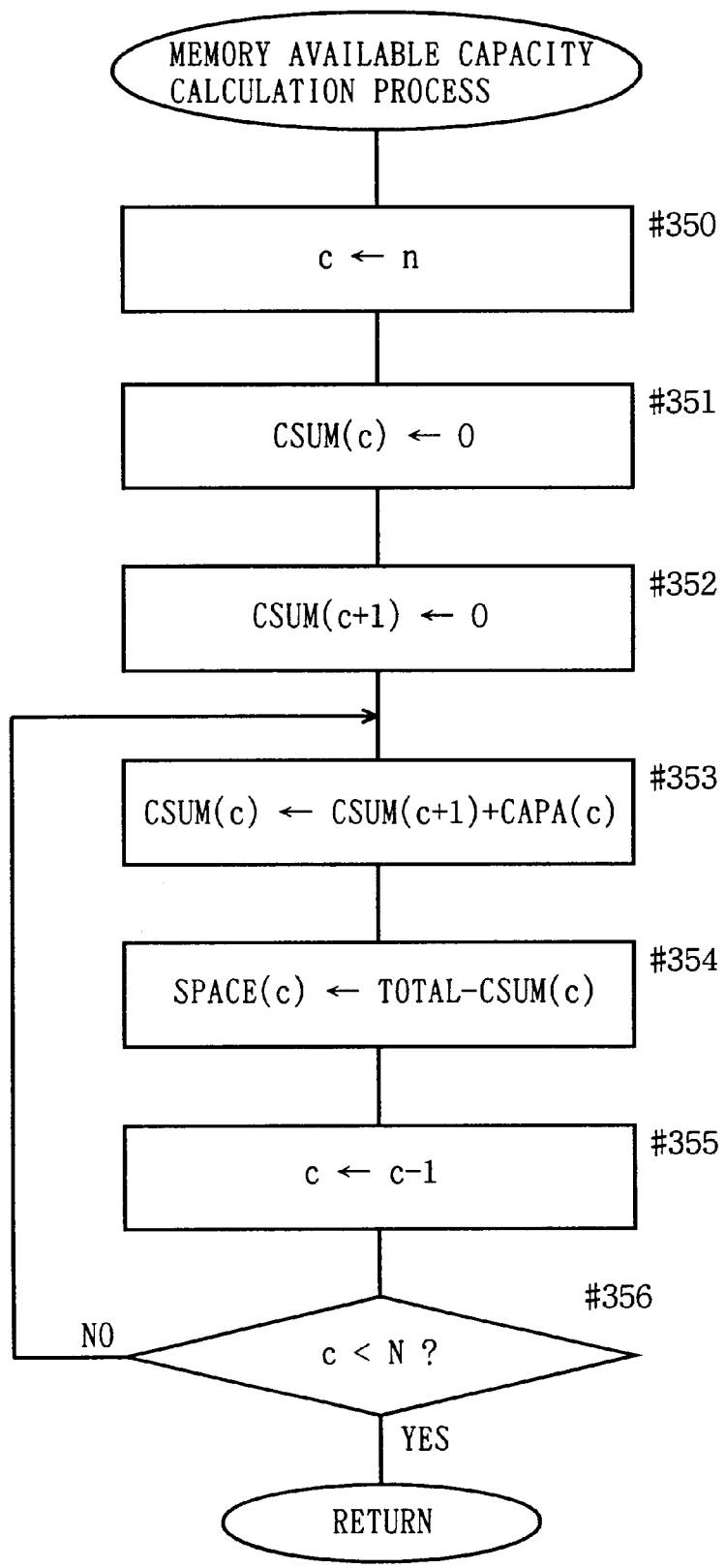
FIG. 34 is a flow chart of the memory available capacity calculation process (#304) of FIG. 29.

FIG. 34 is a flow chart showing the contents of the memory available capacity calculation process (#304) of FIG. 29.

Referring to FIG. 34, the value of variable n indicating the registration number of the last job that is registered is substituted for variable c at step #350. At step #351, the value of variable CSUM(c) is set to 0. At step #352, the value of variable CSUM(c+1) is set to 0.

At step #353, the value of CSUM(c+1)+CAPA(c) is substituted for the value of variable CSUM(c) (refer to FIG. 20). At step #354, the value of the total amount of the memory minus the value of CSUM(c) is inserted into the value of variable SPACE(c). At #355, the value of variable c is decremented by 1. At step #356, determination is made whether c<N. When YES, the program returns.

When NO at step #356, the process from steps #353 and et seq. is carried out.

Second Embodiment

The hardware structure of a copy machine according to a second embodiment of the present invention is similar to that of the first embodiment. In the second embodiment, a process indicated by the flow chart of FIG. 35 is carried out instead of the job correction registration process of FIG. 31.

Figure 35:
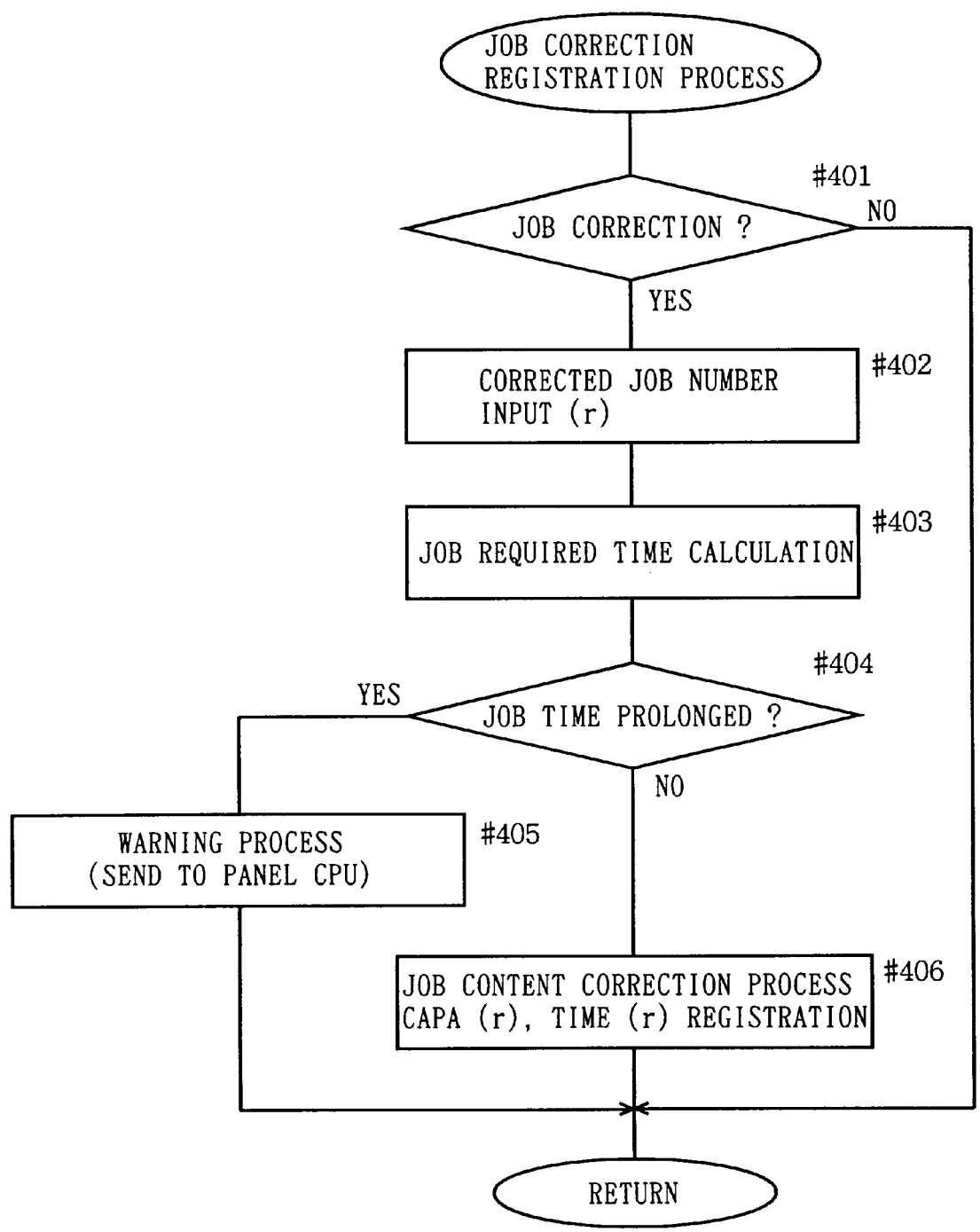
FIG. 35 is a flow chart of the job correction registration process routine according to a second embodiment of the present invention.

Referring to FIG. 35, the process of steps #401–#404 and #406 corresponds to the process of #320–#323 and #326, respectively, of FIG. 31.

According to the flow chart of FIG. 35, a warning is issued to CPU 1 at step #405 when determination is made at step #404 that the corrected job takes a longer processing time. Only a warning is issued, and actual correction of the job content is not effected. In response, CPU 1 provides the screen of FIG. 36 by the job correction warning display process (#242 of FIG. 27). More specifically, a warning is issued to the user indicating that a correction that increases the processing time of a job cannot be carried out. Thus, delay of an ending time of a job registered by another user caused by increase in the processing time of a registered job can be prevented.

Third Embodiment

The hardware structure of a copy machine according to a third embodiment of the present invention is similar to that of the first and second embodiments. In the third embodiment, a process indicated by the flow chart of FIG. 37 is carried out instead of the job correction registration process of FIG. 31.

Figure 37:
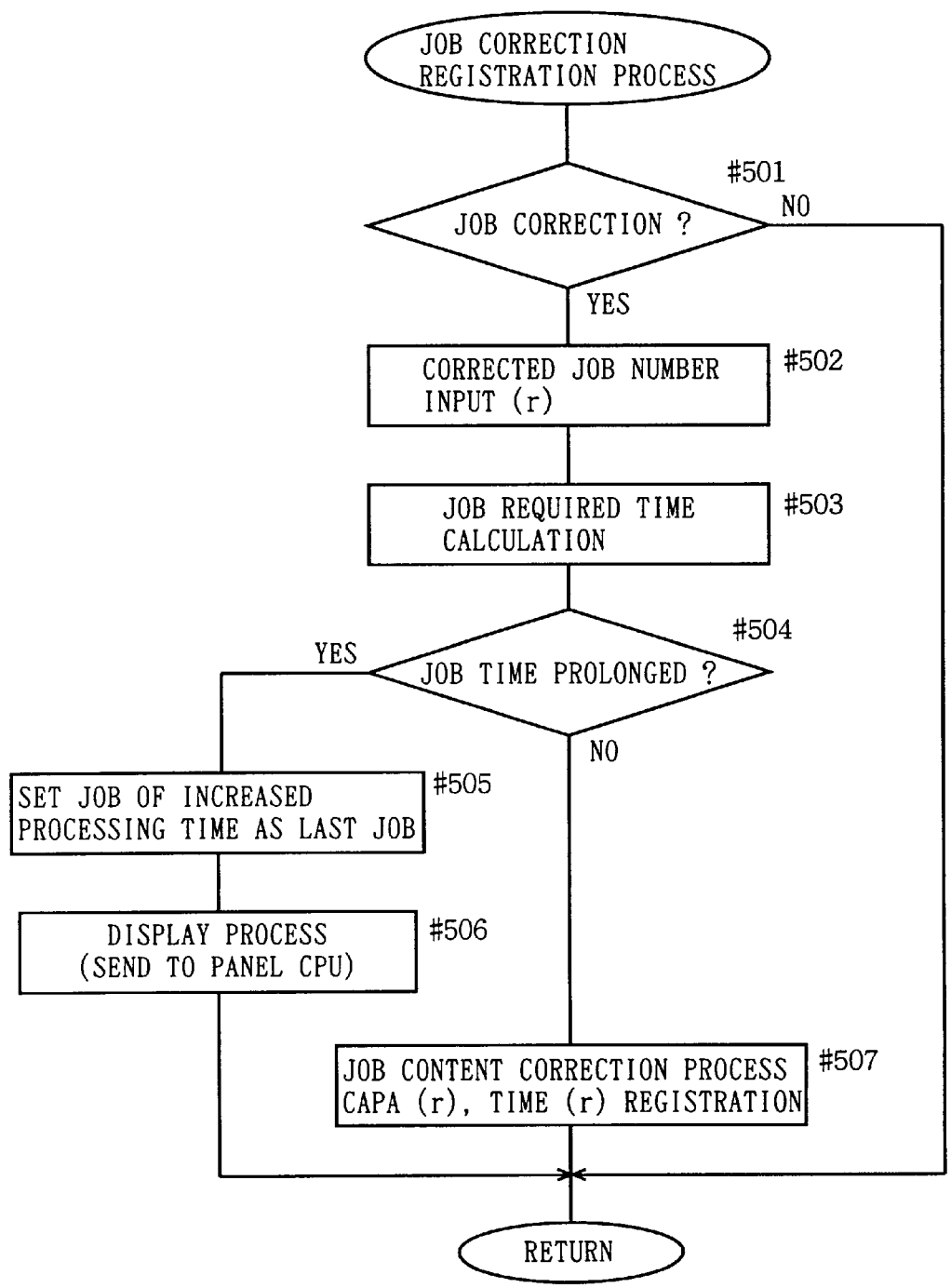
FIG. 37 is a flow chart showing a job correction registration process routine according to a third embodiment of the present invention.

Referring to FIG. 37, the process of steps #501–#504 and #507 correspond to the process of steps #320–#323 and #326, respectively, of FIG. 31.

According to the flow chart of FIG. 37, determination is made whether the completion time of a corrected job is prolonged than that prior to the correction. When the time of the corrected job is prolonged than that prior to correction, i.e., when determination is made that delay will occur, a portion of the process of the job prolonged due to correction is set as the last job. More specifically, the task that is prolonged by correction is postponed until all the jobs in queue have been completed.

Specific displayed contents will be described hereinafter. FIG. 38 corresponds to FIG. 36 of the second embodiment. The case where a job of job number 2 to take 5 copies is altered to take 9 copies by a job correction will be described.

Referring to FIG. 38, the job for the 5 copies prior to correction is carried out at the preregistered order, that is as the second job. As for the remaining four copies, i.e., the task of four copies added by correction is carried out as the last process in all the jobs in queue. In other words, the process is executed after completion of job number 4. The task of the four copies increased by correction is registered as the fifth job.

As an occasion of the ending time of a job being delayed in addition to the above case where the number of copies to be taken is incremented, modification of a copy mode can be considered. In general, the copy processing speed in a duplex copy mode is slower than a simplex copy mode. Therefore, when the mode is altered from the simplex copy mode to duplex copy mode, the ending time of a job is delayed than that prior to correction of the copy mode. In this case, a process is carried out of postponing the task corresponding to the period of time prolonged until the jobs are completed.

More specifically, consider the case where there is a job registered to take 15 single-sided copies of 40 sheets of documents, and correction is made to obtain 15 double-sided copies of 40 sheets of documents. Assuming that the ratio of the time required to carry out a simplex copy operation to a duplex copy operation is 1:1.5 and the time required for a job to be completed is ten minutes prior to correction, the time required for completing a corrected job is 15 minutes. More specifically, there is a problem that the starting and ending time of all the jobs in queue subsequent to the corrected job is delayed respectively by 5 minutes. In this case, the process of the corrected job is terminated at the elapse of the ten minutes required for the job prior to correction. More specifically, the copy operation of the corrected job is interrupted at the elapse of 10 minutes where 10 copies are taken (refer to following equation (1)), and the copy operation of the remaining 5 copies for that job is executed after all the jobs in queue have been completed.

$$15 \text{ minutes}/10 \text{ minutes} = 15 \text{ copies}/X \text{ copies, where } X=10 \text{ copies} \quad \text{equation (1)}$$

Operations that may cause delay in the ending time includes a staple process, punch control, and the like in addition to the above-described mode change. The task corresponding to the additional time (the prolonged time for processing) is deferred as the last process by the above-described operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for controlling a plurality of jobs for execution by an apparatus, said controller comprising:

memory means for storing an order of execution of said plurality of jobs whereby a first job is to be executed prior to a second job, and for storing first data that comprises execution information relating to said first job, wherein said execution information includes a period of time required for executing said first job;

change means for changing content of said first data; and prevention means for preventing execution of said second job from being delayed when the change in the content of said first data increases the period of time required for executing the first job.

2. The controller according to claim 1, wherein said prevention means prevents the second job from being delayed of execution by changing the stored order so that said first job is to be executed after execution of said second job.

3. The controller according to claim 1, wherein said prevention means prevents the second job from being delayed of execution by changing the stored order so that a portion of said first job is to be executed after execution of said second job.

4. The controller according to claim 1, further comprising:

an operation panel from which an operator inputs various commands;

wherein said change means changes the content of said first data in accordance with an input command.

5. The controller according to claim 4, wherein said change means permits an operator to change the content of said first data in a case where specific data is input from said operation panel.

6. The controller according to claim 5, wherein said operation panel comprises a slot which detachably holds a card for storing said specific data of an operator, said specific data being input from said card through said slot.

7. The controller according to claim 1, wherein said apparatus is a printer, and said first and second jobs are print jobs.

8. The controller according to claim 7, wherein said first data includes a print mode according to which said first job is executed by the printer.

9. A controller for controlling a job to be executed by an apparatus, said controller comprising:

memory means for storing an order of execution of a plurality of jobs including a specific job, said memory means further storing specific data related to the specific job;

input means for entering identity data for identifying an operator; and notifying means for notifying the operator of an order of execution of said specific job among the plurality of jobs when said identity data input from said input means corresponds to the specific data of said specific job.

10. The controller according to claim 9, wherein said input means comprises an operation panel from which the operator enters the identity data.

11. The controller according to claim 10, wherein said operation panel comprises a slot for inserting a card that stores the identity data of the operator, said identity data being input from said card through said slot.

12. The controller according to claim 9, wherein said apparatus is a printer, and said plurality of jobs are print jobs.

13. A method for controlling a plurality of jobs to be executed by an apparatus, said method comprising the steps of:

storing an order of execution of said plurality of jobs whereby a first job is to be executed prior to a second job, and storing first data that comprises execution information relating to said first job, wherein said execution information includes a period of time required for executing said first job;

changing content of said first data; and preventing execution of the second job from being delayed when the change in the content of said first data increases the period of time reguired for executing the first job.

14. The method according to claim 10, where in said prevention step prevents said second job from being delayed of execution by changing the stored order so that said first job is to be executed after execution of said second job.

15. The method according to claim 13, wherein said change step changes the content of said first data in accordance with a command input from an operation panel.

16. The method according to claim 15, wherein said change step permits an operator to change the content of said first data in a case where specific data is input from said operation panel.

17. The method according to claim 13, wherein said operation panel includes a slot for inserting a card that stores the specific data of the operator, and wherein the specific data is input from the card through the slot.

18. The method according to claim 13, wherein said apparatus is a printer, and said first and second jobs are print jobs.

19. The method according to claim 18, wherein said first data includes a print mode according to which said first job is executed by the printer.

20. A method for controlling a job to be executed by an apparatus, said method comprising the steps of:

storing an order of execution of a plurality of jobs including a specific job, and further storing specific data related to the specific job;

entering identity data for identifying an operator; and notifying the operator of an order of execution of said specific job among the plurality of jobs when said identity data corresponds to said specific data of said specific job.

21. The method according to claim 20, wherein the operator enters the identity data from an operation panel.

22. The method according to claim 21, wherein the operator inserts a card in a slot of said operation panel, said card for storing the identity data of the operator, wherein the identity data is input from said card through said slot.

23. The method according to claim 20, wherein said apparatus is a printer, and the plurality of jobs are print jobs.

* * * * *

UNITED STATES PATENT AND TRADEMARK OFFICE
CERTIFICATE OF CORRECTION

PATENT NO. : 5,983,051
DATED : November 09, 1999
INVENTOR(S) : Nobuhiro MISHIMA, et al.

It is certified that error appears in the above-identified patent and that said Letter Patent is hereby corrected as shown below:

On the Title page:

item [54], after "PLURALITY" insert --OF--.

Signed and Sealed this

Twentieth Day of March, 2001

Attest:

NICHOLAS P. GODICI

Attesting Officer     Acting Director of the United States Patent and Trademark Office